United States Patent
Babaei et al.

(10) Patent No.: US 10,863,380 B2
(45) Date of Patent: Dec. 8, 2020

(54) BUFFER STATUS REPORTING PROCEDURE IN A WIRELESS DEVICE AND WIRELESS NETWORK

(71) Applicant: Ofinno Technologies, LLC, Herndon, VA (US)

(72) Inventors: Alireza Babaei, Fairfax, VA (US); Esmael Dinan, Herndon, VA (US)

(73) Assignee: Ofinno, LLC, Reston, VA (US)

(*) Notice: Subject to any disclaimer, the term of this patent is extended or adjusted under 35 U.S.C. 154(b) by 28 days.

(21) Appl. No.: 15/924,070

(22) Filed: Mar. 16, 2018

(65) Prior Publication Data

US 2018/0270699 A1  Sep. 20, 2018

Related U.S. Application Data

(60) Provisional application No. 62/472,032, filed on Mar. 16, 2017.

(51) Int. Cl.
*H04W 28/02* (2009.01)
*H04W 72/04* (2009.01)
(Continued)

(52) U.S. Cl.
CPC ....... *H04W 28/0278* (2013.01); *H04W 24/08* (2013.01); *H04W 72/042* (2013.01);
(Continued)

(58) Field of Classification Search
CPC ............ H04W 24/08; H04W 28/0278; H04W 72/042; H04W 72/1242
See application file for complete search history.

(56) References Cited

U.S. PATENT DOCUMENTS

2015/0230248 A1* 8/2015 Kim .................... H04L 5/0007
                                                   370/329
2015/0282150 A1  10/2015 Nigam et al.
(Continued)

FOREIGN PATENT DOCUMENTS

EP          2124499 B1    8/2010
EP          2241124 B1    5/2012
(Continued)

OTHER PUBLICATIONS

3GPP TS 36.211 V14.1.0 (Dec. 2016); 3rd Generation Partnership Project; Technical Specification Group Radio Access Network; Evolved Universal Terrestrial Radio Access (E-UTRA); Physical channels and modulation (Release 14).
(Continued)

*Primary Examiner* — Rhonda L Murphy
(74) *Attorney, Agent, or Firm* — David Grossman; Kavon Nasabzadeh; Philip Smith

(57) ABSTRACT

A wireless device receives configuration parameters of logical channels. The logical channels comprise 1st logical channel having a $1^{st}$ logical channel priority. The 1st logical channel is mapped to transmission duration(s). A buffer status report is triggered in response to: uplink data becoming available for the 1st logical channel in 1st plurality logical channels with uplink data; and the 1st logical channel priority being higher than priorit(ies) of selected logical channel(s) in the 1st logical channel(s). The selected logical channel(s) are selected in response to being mapped to transmission duration(s). The buffer status report may be transmitted to the base station.

20 Claims, 29 Drawing Sheets

(51) Int. Cl.
*H04W 24/08* (2009.01)
*H04W 72/12* (2009.01)

(52) U.S. Cl.
CPC ... *H04W 72/0453* (2013.01); *H04W 72/1284* (2013.01); *H04W 72/1242* (2013.01); *H04W 72/1289* (2013.01)

(56) References Cited

U.S. PATENT DOCUMENTS

| | | | | |
|---|---|---|---|---|
| 2018/0270702 | A1* | 9/2018 | Lee | H04W 72/1242 |
| 2019/0364586 | A1* | 11/2019 | Li | H04W 72/04 |

FOREIGN PATENT DOCUMENTS

| | | | |
|---|---|---|---|
| EP | 2433448 | B1 | 3/2013 |
| EP | 2775773 | B1 | 7/2015 |
| EP | 2672649 | B1 | 10/2015 |
| EP | 2421313 | B1 | 1/2017 |
| EP | 2945440 | B1 | 3/2017 |
| WO | 2011120448 | A1 | 10/2011 |
| WO | 2017074437 | A1 | 5/2017 |
| WO | 2017196658 | A1 | 11/2017 |

OTHER PUBLICATIONS

3GPP TS 36.212 V14.1.0 (Dec. 2016); 3rd Generation Partnership Project; Technical Specification Group Radio Access Network; Evolved Universal Terrestrial Radio Access (E-UTRA); Multiplexing and channel coding (Release 14).
3GPP TS 36.213 V14.1.0 (Dec. 2016); 3rd Generation Partnership Project; Technical Specification Group Radio Access Network; Evolved Universal Terrestrial Radio Access (E-UTRA); Physical layer procedures (Release 14).
3GPP TS 36.300 V14.1.0 (Dec. 2016); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.321 V14.1.0 (Dec. 2016); 3rd Generation Partnership Project; Technical Specification Group Radio Access Network; Evolved Universal Terrestrial Radio Access (E-UTRA); Medium Access Control (MAC) protocol specification (Release 14).
R2-1700296; 3GPP TSG-RAN WG2 NR AdHoc; Spokane, USA, Jan. 17-19, 2017; Agenda item: 3.2.1.2; Source: Samsung; Title: MAC Aspects to Support Multiple Service Verticals; Document for: Discussion and Decision.
R2-1700812; 3GPP TSG-RAN WG2 Meeting #97; Athens, Greece, Feb. 13-17, 2017; Agenda item: 10.21.4; Source: Nokia, Alcatel-Lucent Shanghai Bell, MediaTek Inc., NTT DOCOMO INC.; Title: Basic Scheduler Operation in NR; WID/SID: FS_NR_newRAT—Release 14; Document for: Discussion and Decision.
R2-1700838; 3GPP TSG-RAN WG2 #97; Athens, Greece, Feb. 13-17, 2017; Update of R2-1700430; Agenda Item: 10.2.1.4; Source: Ericsson; Title: Uplink dynamic scheduling in NR; Document for: Discussion, Decision.
R2-1700960; 3GPP TSG-RAN2 #97; Athens, Greece, Feb. 13-17, 2017; Agenda Item: 10.2.1.4; Source: OPPO; Title: Discussion on scheduling enhancement; Document for: Discussion, Decision.
R2-1701203; 3GPP TSG-RAN WG2 #97; Athens, Greece, Feb. 13-17, 2017; revision of R2-1700085; Agenda item: 10.2.1.2; Source: Huawei, HiSilicon; Title: LCP with Multiple Numerologies; Document for: Discussion and Decision.
R2-1701207; 3GPP TSG-RAN WG2 #97; Athens, Greece, Feb. 13-17, 2017; Revision of R2-1700175; Agenda item: 10.2.1.4; Source: Huawei, HiSilicon; Title: UL Scheduling Enhancement in NR; Document for: Discussion and decision.
R2-1701332; 3GPP TSG-RAN WG2 #97; Athens, Greece, Feb. 13-17, 2017; Resubmission of R2-1700252; Agenda item: 10.2.1.2; Source: Nokia, Alcatel-Lucent Shanghai Bell; Title: Logical channel to numerologies/TTI length mapping; WID/SID: FS_NR_newRAT—Release 14; Document for: Discussion and Decision.
R2-1701403; 3GPP TSG-RAN WG2 Meeting #97; Athens, Greece, Feb. 13-17, 2017; Agenda Item: 10.2.1.2; Source: ETRI; Title: UE procedure for multiple numerologies; Document for: Discussion and Decision.
R2-1701448; 3GPP TSG-RAN WG2 Meeting #97; Athens, Greece, Feb. 13-17, 2017; Resubmission of R2-1700354; Agenda Item: 10.2.1.4 Source: ASUSTeK; Title: Discussion on SR and BSR in NR; Document for: Discussion and Decision.
R2-1701470; 3GPP TSG-RAN WG2 NR #97 Meeting; Athens, Greece Feb. 13-17, 2017; Revision of R2-1700614; Agenda item: 10.2.1.2; Source: Samsung; Title: Layer 2 functions for multiple numerologies; Document for: Discussion & Decision.
R2-1701535; 3GPP TSG-RAN WG2 Meeting #97; Athens, Greece, Feb. 13-17, 2017; Resubmission of R2-1700420; Agenda Item: 10.2.1.4 (FS_ NR_newRAT); Source: LG Electronics Inc.; Title: BSR enhancement for New RAT; Document for: Discussion and Decision.
R2-1701536; 3GPP TSG-RAN WG2 Meeting #97; Athens, Greece, Feb. 13-17, 2017; Resubmission of R2-1700421; Agenda Item: 10.2.1.4 (FS_ NR_newRAT); Source: LG Electronics Inc.; Title: SR enhancement for New RAT; Document for: Discussion and Decision.
R2-1701550; 3GPP TSG-RAN WG2 NR#97; Athens, Greece, Feb. 13-17, 2017; Revision of R2-1700296; Agenda item: 10.2.1.2; Source: Samsung; Title: MAC to Support Multiple Service Verticals and Numerologies; Document for: Discussion and Decision.
R2-1701619; 3GPP TSG-RAN WG2 #97; Athens, Greece, Feb. 13-17, 2017; Agenda item: 10.2.1.4; Source: Samsung Electronics R&D Institute UK; Title: Multiple numerology considerations for SR; Document for: Discussion and Decision.
R2-1701723; 3GPP TSG RAN WG2 Meeting #97; Athens, Greece, Feb. 13-17, 2017; Agenda item: 10.2.1.4; Source: Intel Corporation; Title: Enhancements of SR/BSR in NR; Document for: Discussion and decision.
R2-1701724; 3GPP TSG-RAN2 Meeting #97; Athens, Greece Feb. 13-17, 2017; Agenda item: 10.2.14; Source: Intel Corporation; Title: Scheduling aspects to support multiple numerologies; Document for: Discussion and decision.
R2-1701773; 3GPP TSG-RAN WG2 Meeting #97; Athens, Greece, Feb. 13-17, 2017; Revision of R2-1700566; Agenda item: 10.2.1.4 MAC; Source: Qualcomm Incorporated; Title: Considerations on uplink scheduling in NR; WID/SID: FS_ NR_newRAT—Release 14; Document for: Discussion and Decision.
R2-1701993; 3GPP TSG RAN WG2 #97; Athens, Greece, Feb. 13-17, 2017; Resubmission of R2-1700603; Agenda Item: 10.2.1.4; Souce: Samsung; Title: UL Scheduling Issues for Latency Reduction in NR; Document for: Discussion/Decision.

* cited by examiner

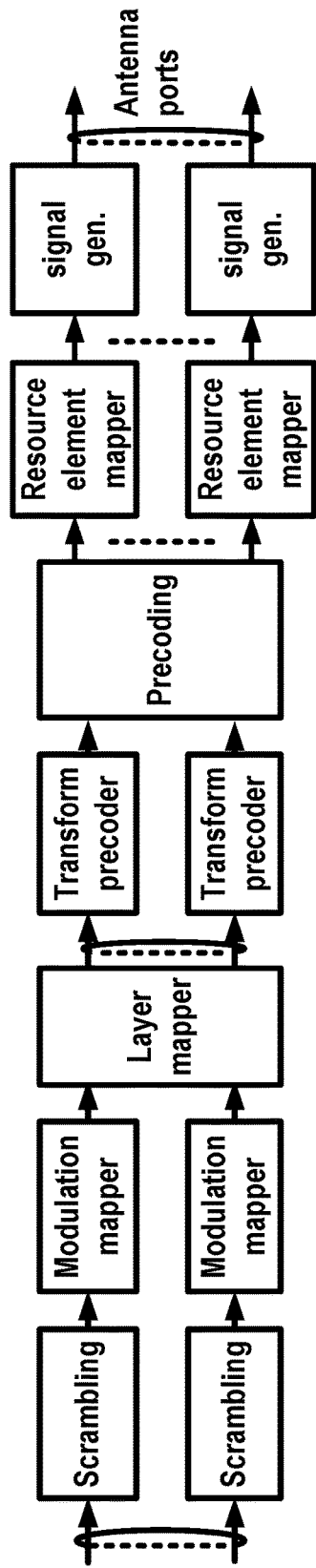
FIG. 4A
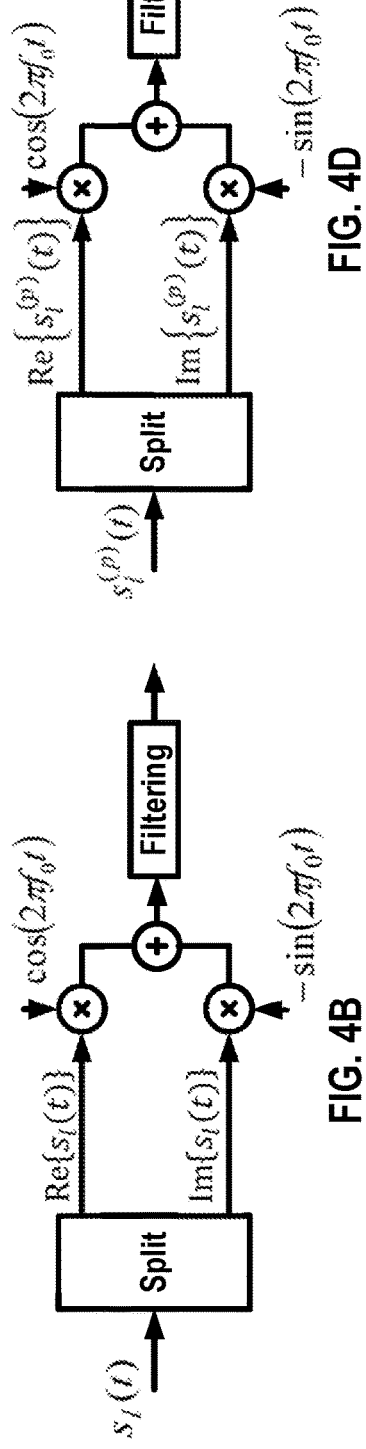
FIG. 4B
FIG. 4D
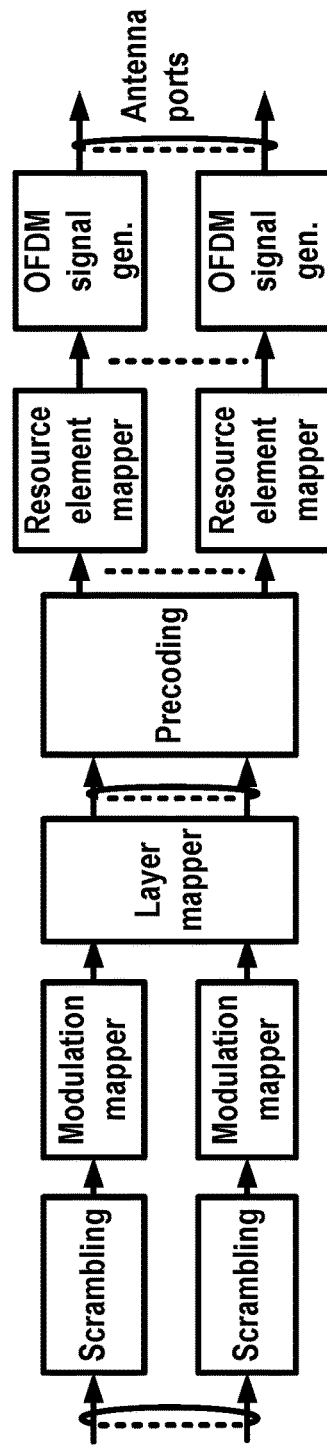
FIG. 4C

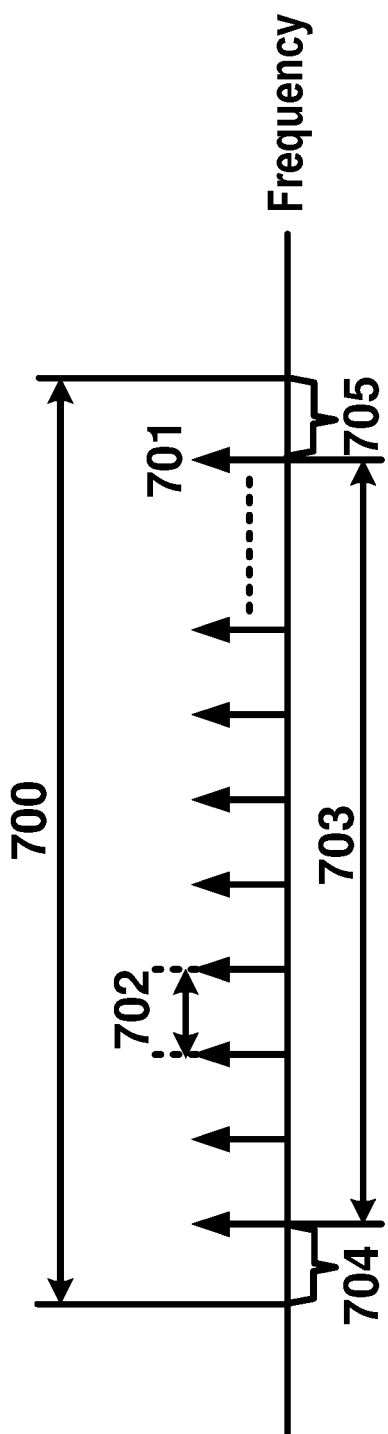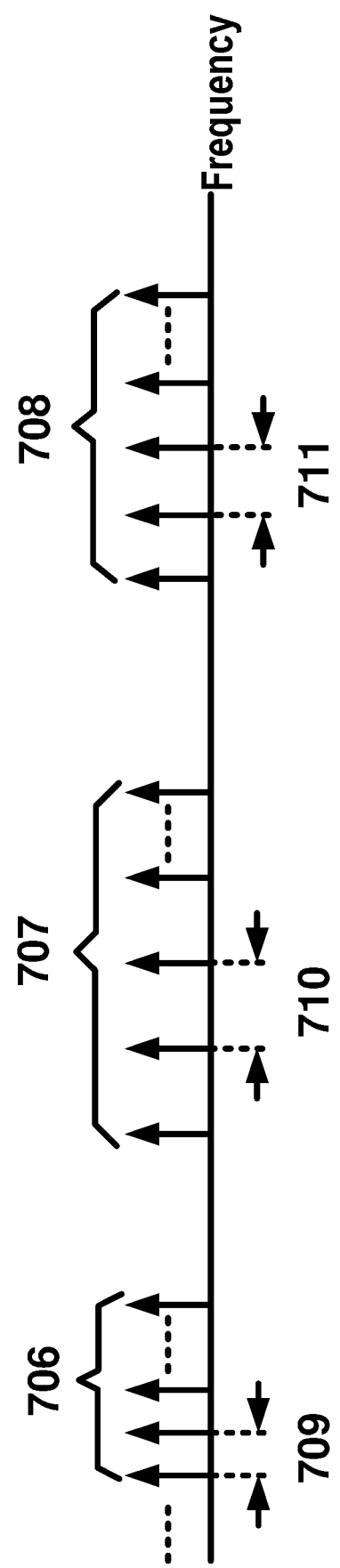

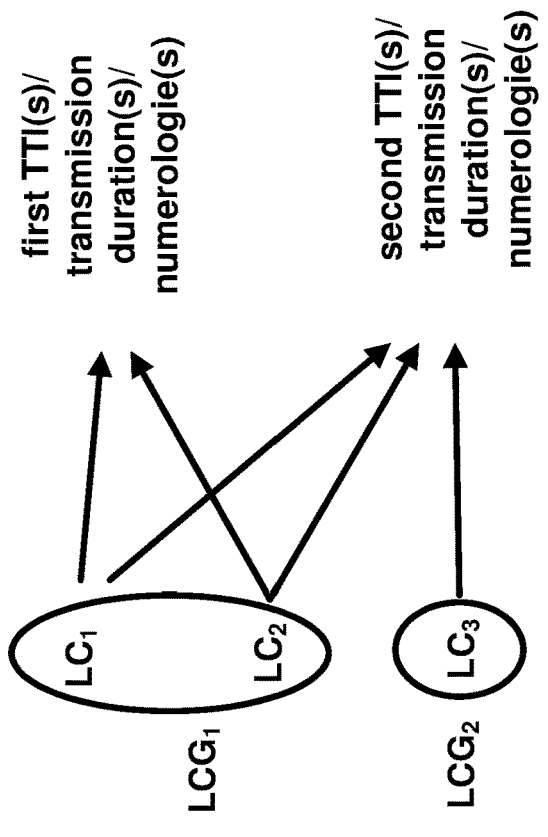
Example 2
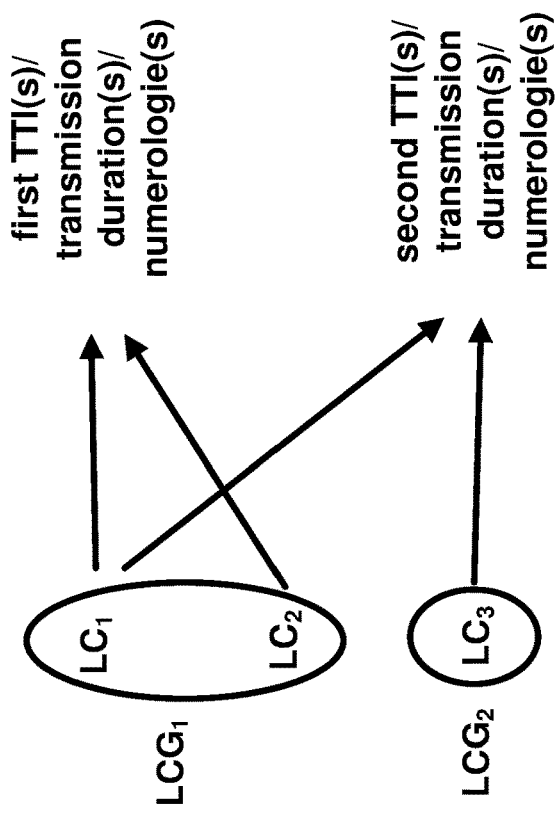
Example 1
FIG. 18

| LCG$_N$ | | | LCG$_2$ | LCG$_1$ | LCG$_0$ |
|---|---|---|---|---|---|
| 1 | 0 | — — — | 1 | 0 | 1 |
| BSR for LCG$_0$ ||||||
| BSR for LCG$_2$ ||||||
| BSR for LCG$_N$ ||||||

| LC$_N$ | | | LC$_2$ | LC$_1$ | LC$_0$ |
|---|---|---|---|---|---|
| 1 | 0 | — — — | 1 | 0 | 1 |
| BSR for LC$_0$ ||||||
| BSR for LC$_2$ ||||||
| BSR for LC$_N$ ||||||

FIG. 19

Example MAC subheader

| LCID for $LC_m$ | BSR for $LC_m$ |
|---|---|
| LCID for $LC_n$ | BSR for $LC_n$ |
| LCG ID for $LCG_k$ | BSR for $LCG_k$ |

Example Buffer Status Report

| L | | LCID for $LC_m$ | BSR for $LC_m$ |
|---|---|---|---|
| BSR for $LC_m$ | LCID for $LC_n$ | | BSR for $LC_n$ |
| BSR for $LC_n$ | LCG ID for $LCG_k$ | | BSR for $LCG_k$ |
| BSR for $LCG_k$ | LCG ID for $LCG_l$ | | BSR for $LCG_l$ |

Example Buffer Status Report

FIG. 20

Receive, by a wireless device, configuration parameters of logical channel(s) grouped into logical channel group(s) comprising a 1st logical channel group
2510

Transmit a truncated BSR in response to a number of padding bits: being larger than a size of a short BSR plus a short BSR subheader; and being smaller than a size of a long BSR plus a long BSR subheader
2520

Receive, by a wireless device, configuration parameters of logical channel(s) grouped into logical channel group(s)
2610

Transmit a truncated BSR in response to a number of padding bits: being larger than a size of a short BSR plus a short BSR subheader; and being smaller than a size of a long BSR plus a long BSR subheader
2620

Transmit, by a base station, configuration parameters of logical channel(s) grouped into logical channel group(s) comprising a 1st logical channel group
2710

Receive a truncated BSR in response to the number of padding bits: being larger than a size of a short BSR plus a short BSR subheader; and being smaller than a size of a long BSR plus a long BSR subheader
2720

Receive, by a wireless device from a base station, configuration parameters of logical channel(s) comprising a 1st logical channel having a 1st logical channel priority, where the 1st logical channel is mapped to transmission duration(s)
2810

Trigger a buffer status report in response to: uplink data becoming available for the 1st logical channel in a 1st logical channel(s) with uplink data; and the 1st logical channel priority being higher than priorit(ies) of selected logical channel(s) in the 1st logical channel(s)
2820

Transmit the buffer status report to the base station
2830

FIG. 28

BUFFER STATUS REPORTING PROCEDURE IN A WIRELESS DEVICE AND WIRELESS NETWORK

CROSS-REFERENCE TO RELATED APPLICATIONS

This application claims the benefit of U.S. Provisional Application No. 62/472,032, filed Mar. 16, 2017, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

FIG. 18 is a diagram of example logical channel grouping and mapping as per an aspect of an embodiment of the present disclosure.

FIG. 19 is a diagram of example buffer status report formats as per an aspect of an embodiment of the present disclosure.

FIG. 20 is a diagram of example buffer status report format and process as per an aspect of an embodiment of the present disclosure.

FIG. 28 is an example flow diagram as per an aspect of an embodiment of the present disclosure.

DETAILED DESCRIPTION OF EMBODIMENTS

Figure 1:
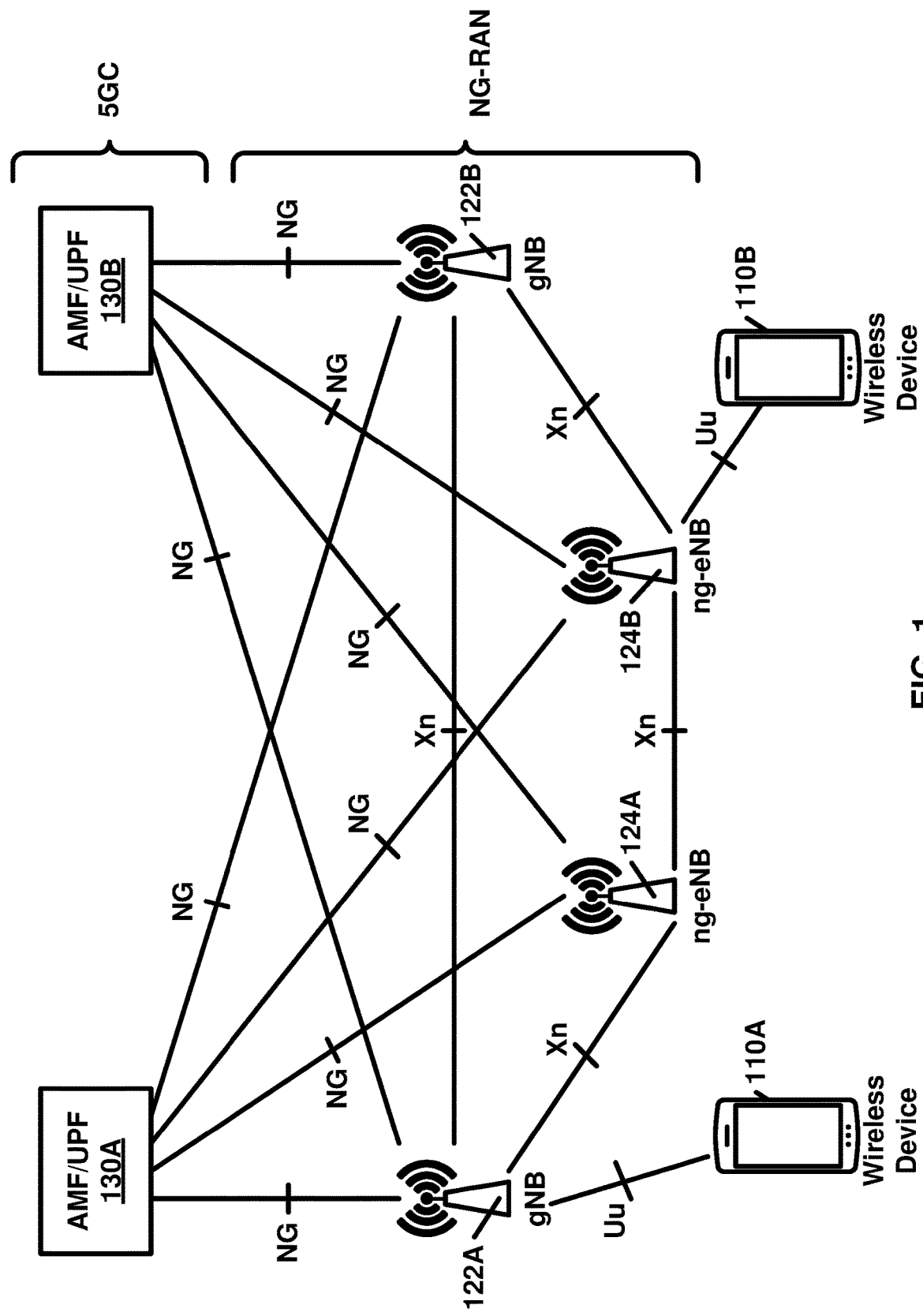
FIG. 1 is a diagram of an example RAN architecture as per an aspect of an embodiment of the present disclosure.

Example embodiments of the present disclosure enable operation of buffer status reporting. Embodiments of the technology disclosed herein may be employed in the technical field of multicarrier communication systems.

The following Acronyms are used throughout the present disclosure:

| | |
|---|---|
| 3 GPP | 3rd Generation Partnership Project |
| 5 GC | 5 G Core Network |
| ACK | Acknowledgement |
| AMF | Access and Mobility Management Function |
| ARQ | Automatic Repeat Request |
| AS | Access Stratum |
| ASIC | Application-Specific Integrated Circuit |
| BA | Bandwidth Adaptation |
| BCCH | Broadcast Control Channel |
| BCH | Broadcast Channel |
| BPSK | Binary Phase Shift Keying |
| BWP | Bandwidth Part |
| CA | Carrier Aggregation |
| CC | Component Carrier |
| CCCH | Common Control CHannel |
| CDMA | Code Division Multiple Access |
| CN | Core Network |
| CP | Cyclic Prefix |
| CP-OFDM | Cyclic Prefix—Orthogonal Frequency Division Multiplex |
| C-RNTI | Cell-Radio Network Temporary Identifier |
| CS | Configured Scheduling |
| CSI | Channel State Information |
| CSI-RS | Channel State Information-Reference Signal |
| CQI | Channel Quality Indicator |
| CSS | Common Search Space |
| CU | Central Unit |
| DC | Dual Connectivity |

| | |
|---|---|
| DCCH | Dedicated Control CHannel |
| DCI | Downlink Control Information |
| DL | Downlink |
| DL-SCH | Downlink Shared CHannel |
| DM-RS | DeModulation Reference Signal |
| DRB | Data Radio Bearer |
| DRX | Discontinuous Reception |
| DTCH | Dedicated Traffic CHannel |
| DU | Distributed Unit |
| EPC | Evolved Packet Core |
| E-UTRA | Evolved UMTS Terrestrial Radio Access |
| E-UTRAN | Evolved-Universal Terrestrial Radio Access Network |
| FDD | Frequency Division Duplex |
| FPGA | Field Programmable Gate Arrays |
| F1-C | F1-Control plane |
| F1-U | F1-User plane |
| gNB | next generation Node B |
| HARQ | Hybrid Automatic Repeat reQuest |
| HDL | Hardware Description Languages |
| IE | Information Element |
| IP | Internet Protocol |
| LCID | Logical Channel IDentifier |
| LTE | Long Term Evolution |
| MAC | Media Access Control |
| MCG | Master Cell Group |
| MCS | Modulation and Coding Scheme |
| MeNB | Master evolved Node B |
| MIB | Master Information Block |
| MME | Mobility Management Entity |
| MN | Master Node |
| NACK | Negative Acknowledgement |
| NAS | Non-Access Stratum |
| NG CP | Next Generation Control Plane |
| NGC | Next Generation Core |
| NG-C | NG-Control plane |
| ng-eNB | next generation evolved Node B |
| NG-U | NG-User plane |
| NR | New Radio |
| NR MAC | New Radio MAC |
| NR PDCP | New Radio PDCP |
| NR PHY | New Radio PHYsical |
| NR RLC | New Radio RLC |
| NR RRC | New Radio RRC |
| NSSAI | Network Slice Selection Assistance Information |
| O&M | Operation and Maintenance |
| OFDM | Orthogonal Frequency Division Multiplexing |
| PBCH | Physical Broadcast CHannel |
| PCC | Primary Component Carrier |
| PCCH | Paging Control CHannel |
| PCell | Primary Cell |
| PCH | Paging CHannel |
| PDCCH | Physical Downlink Control CHannel |
| PDCP | Packet Data Convergence Protocol |
| PDSCH | Physical Downlink Shared CHannel |
| PDU | Protocol Data Unit |
| PHICH | Physical HARQ Indicator CHannel |
| PHY | PHYsical |
| PLMN | Public Land Mobile Network |
| PMI | Precoding Matrix Indicator |
| PRACH | Physical Random Access CHannel |
| PRB | Physical Resource Block |
| PSCell | Primary Secondary Cell |
| PSS | Primary Synchronization Signal |
| pTAG | primary Timing Advance Group |
| PT-RS | Phase Tracking Reference Signal |
| PUCCH | Physical Uplink Control CHannel |
| PUSCH | Physical Uplink Shared CHannel |
| QAM | Quadrature Amplitude Modulation |
| QFI | Quality of Service Indicator |
| QoS | Quality of Service |
| QPSK | Quadrature Phase Shift Keying |
| RA | Random Access |
| RACH | RandomAccess CHannel |
| RAN | Radio Access Network |
| RAT | Radio Access Technology |
| RA-RNTI | Random Access-Radio Network Temporary Identifier |
| RB | Resource Blocks |
| RBG | Resource Block Groups |
| RI | Rank Indicator |
| RLC | Radio Link Control |
| RRC | Radio Resource Control |
| RS | Reference Signal |
| RSRP | Reference Signal Received Power |
| SCC | Secondary Component Carrier |
| SCell | Secondary Cell |
| SCG | Secondary Cell Group |
| SC-FDMA | Single Carrier-Frequency Division Multiple Access |
| SDAP | Service Data Adaptation Protocol |
| SDU | Service Data Unit |
| SeNB | Secondary evolved Node B |
| SFN | System Frame Number |
| S-GW | Serving GateWay |
| SI | System Information |
| SIB | System Information Block |
| SMF | Session Management Function |
| SN | Secondary Node |
| SpCell | Special Cell |
| SRB | Signaling Radio Bearer |
| SRS | Sounding Reference Signal |
| SS | Synchronization Signal |
| SSS | Secondary Synchronization Signal |
| sTAG | secondary Timing Advance Group |
| TA | Timing Advance |
| TAG | Timing Advance Group |
| TAI | Tracking Area Identifier |
| TAT | Time Alignment Timer |
| TB | Transport Block |
| TC-RNTI | Temporary Cell-Radio Network Temporary Identifier |
| TDD | Time Division Duplex |
| TDMA | Time Division Multiple Access |
| TTI | Transmission Time Interval |
| UCI | Uplink Control Information |
| UE | User Equipment |
| UL | Uplink |
| UL-SCH | Uplink Shared CHannel |
| UPF | User Plane Function |
| UPGW | User Plane Gateway |
| VHDL | VHSIC Hardware Description Language |
| Xn-C | Xn-Control plane |
| Xn-U | Xn-User plane |

Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
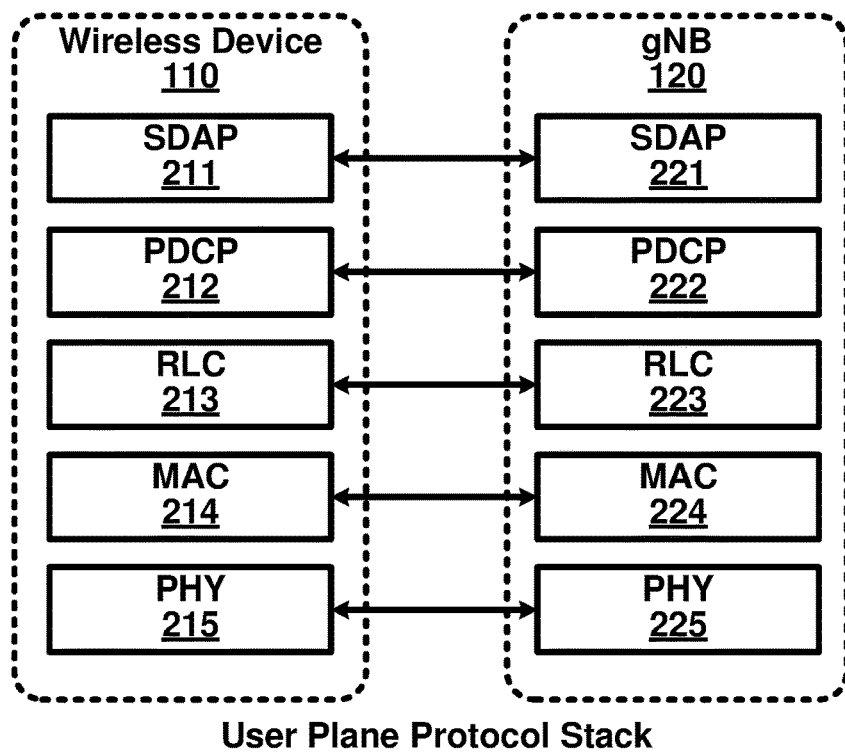
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
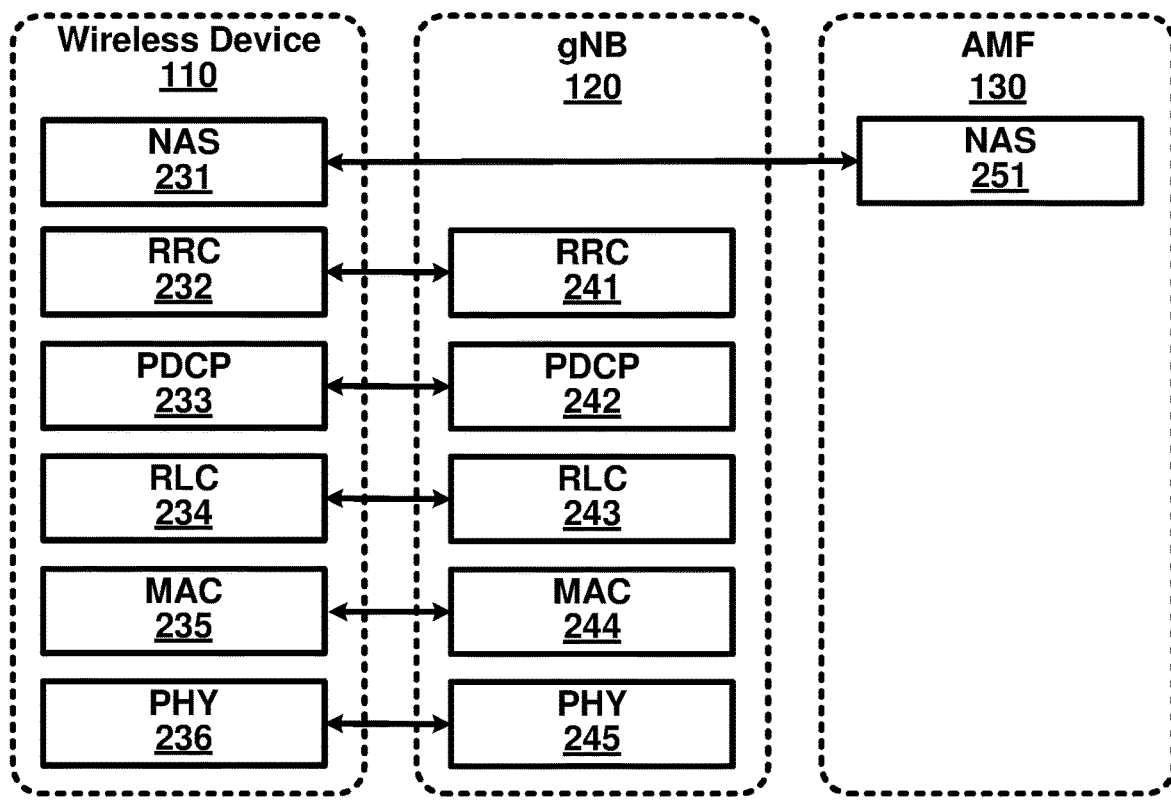
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
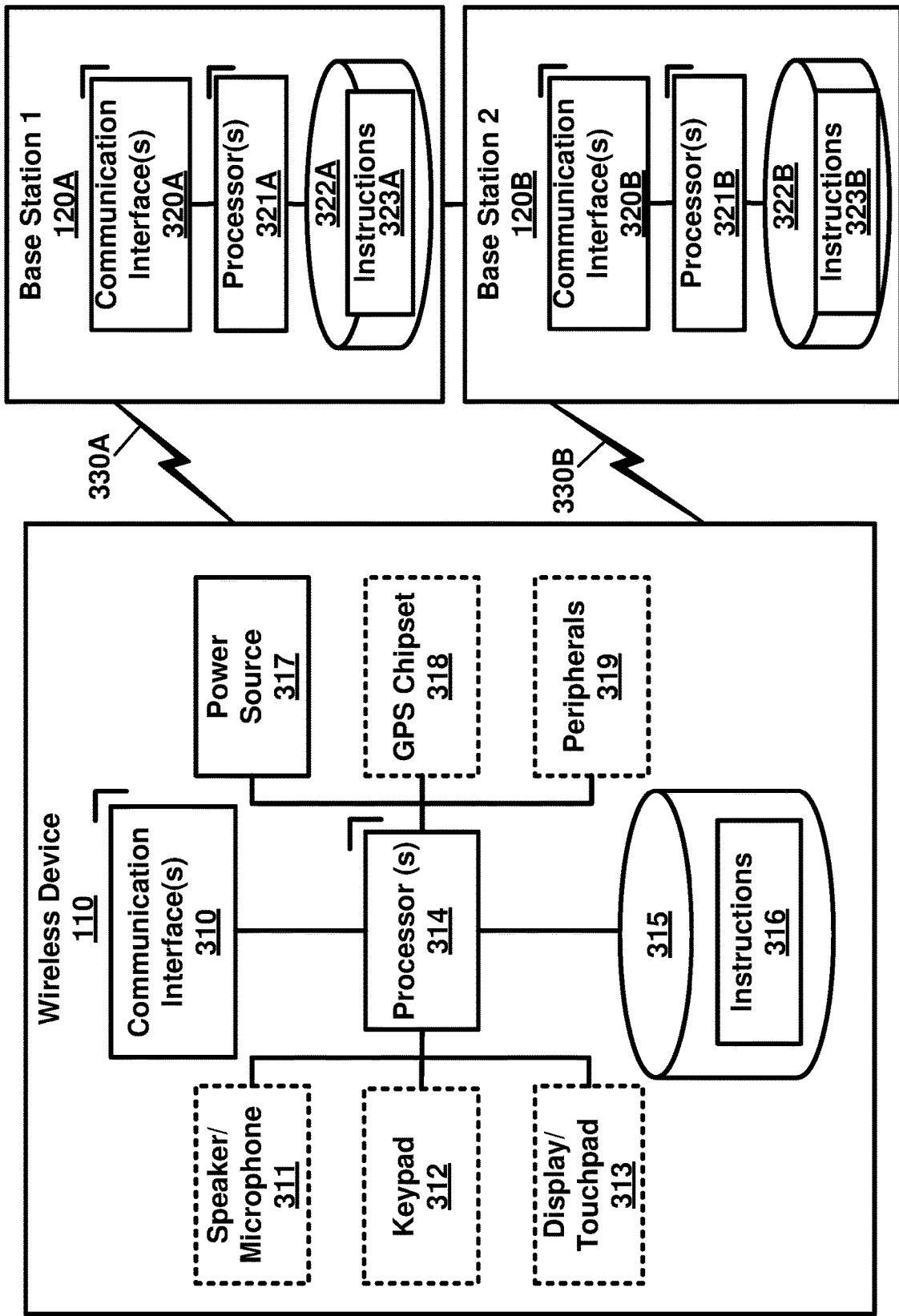
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
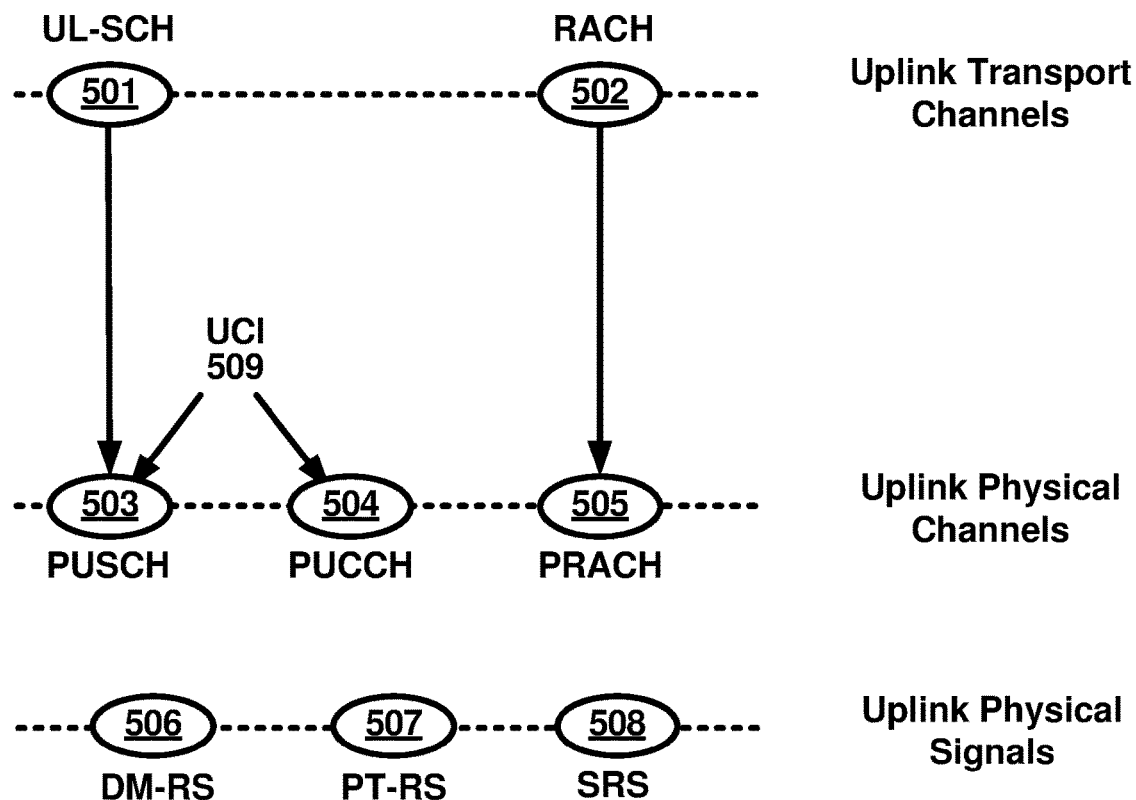
FIG. 5A is a diagram of an example uplink channel mapping and example uplink physical signals as per an aspect of an embodiment of the present disclosure.
Figure 5B:
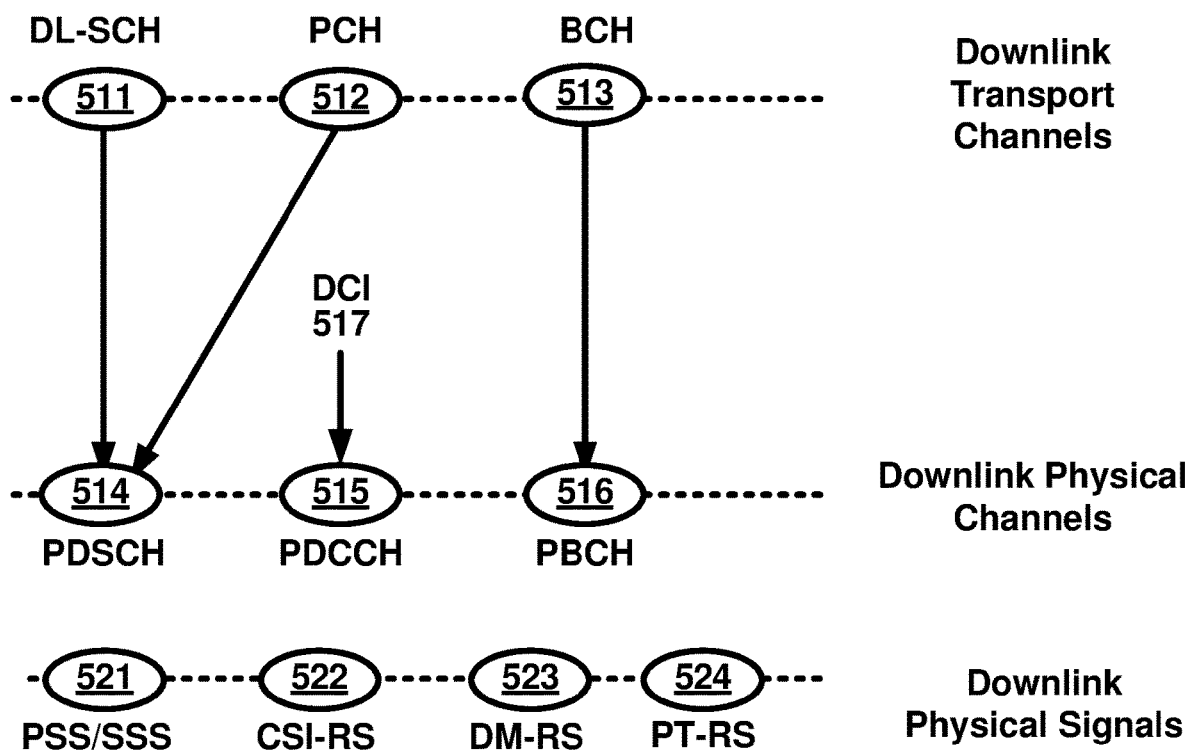
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (minislot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
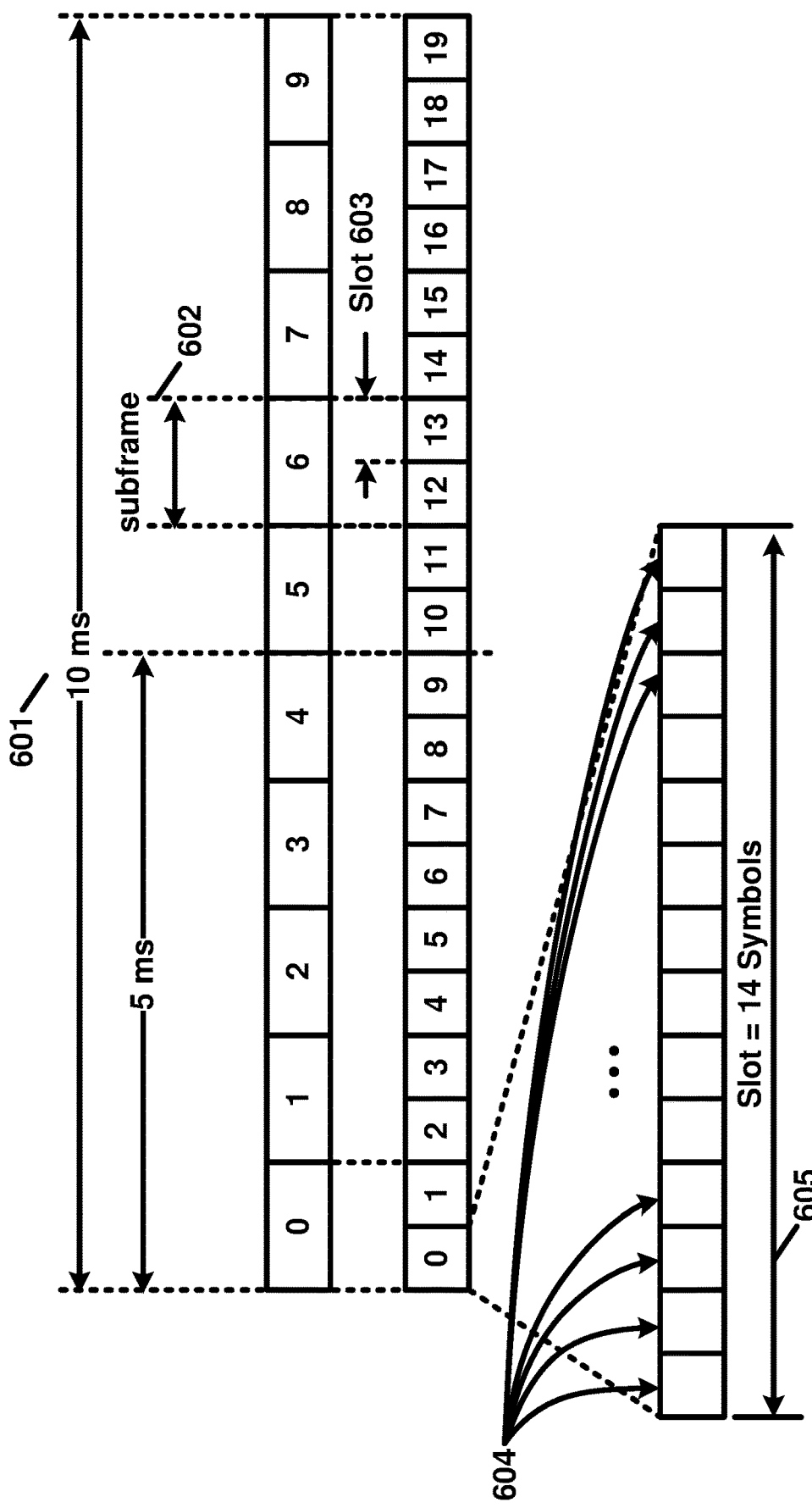
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
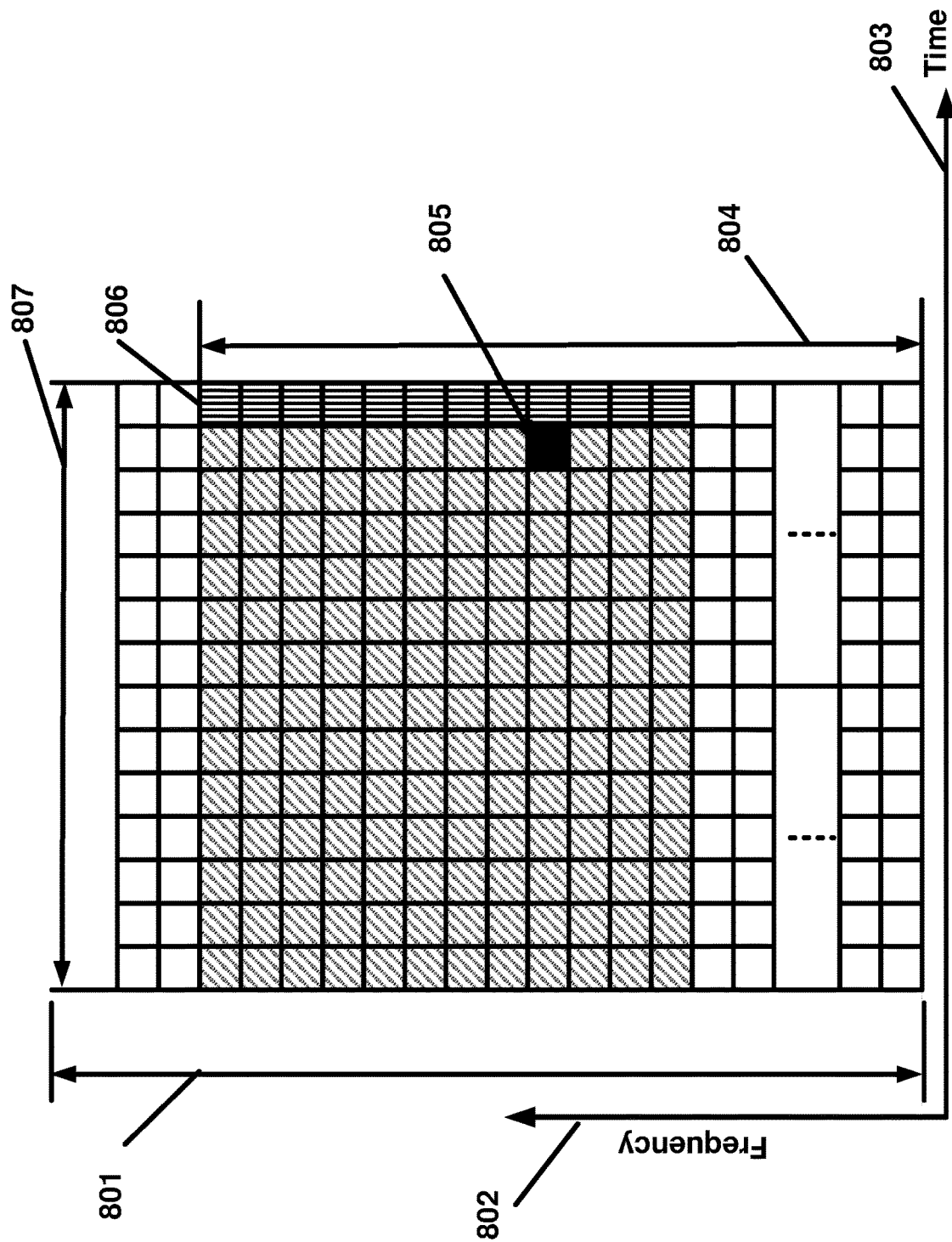
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing informations (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 9:
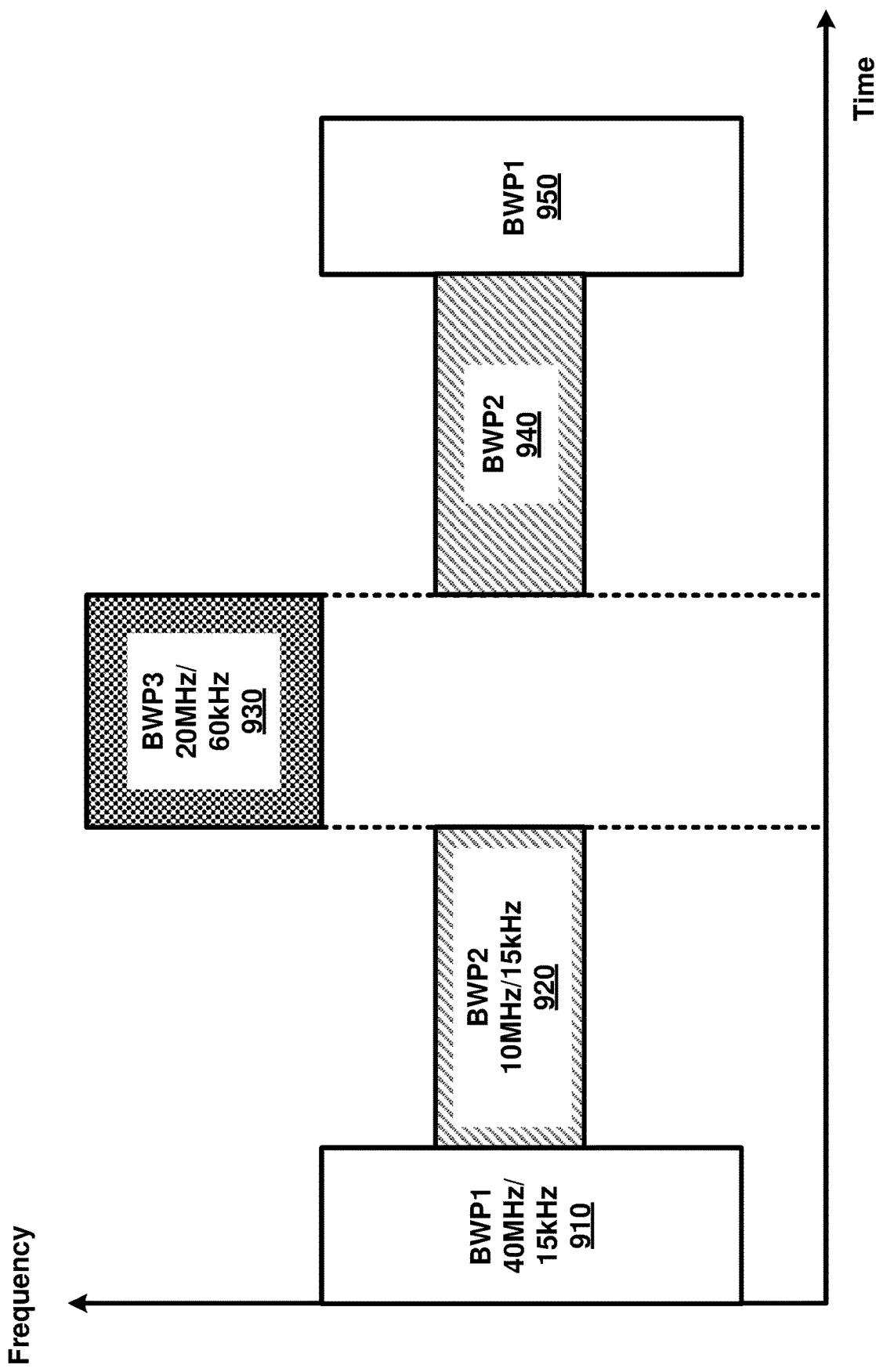
FIG. 9 is an example diagram of configured BWPs as per an aspect of an embodiment of the present disclosure.

FIG. 9 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 9 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 10A:
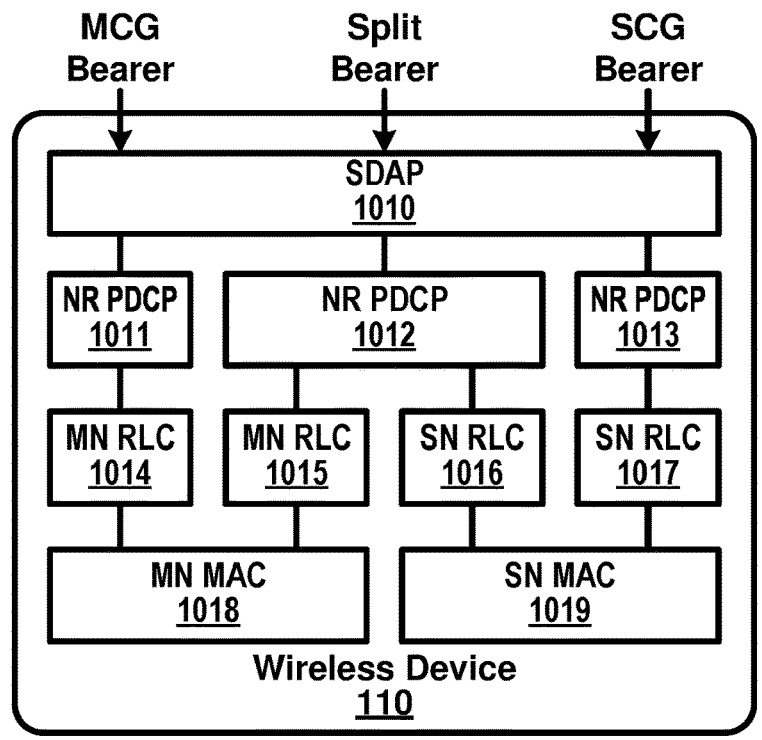
FIG. 10A, and FIG. 10B are diagrams of an example multi connectivity as per an aspect of an embodiment of the present disclosure.
Figure 10B:
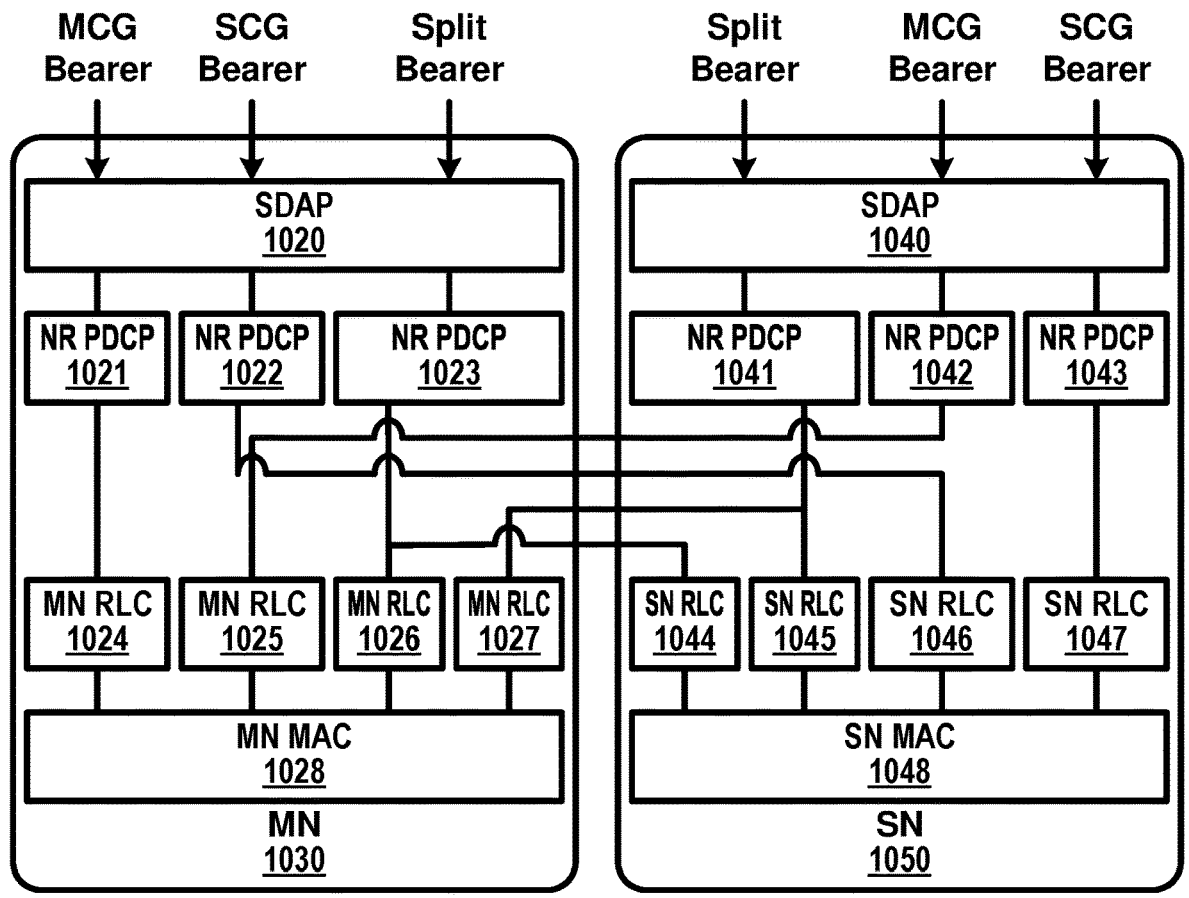

FIG. 10A and FIG. 10B show packet flows employing a multi connectivity (e.g. dual connectivity, multi connectivity, tight interworking, and/or the like). FIG. 10A is an example diagram of a protocol structure of a wireless device 110 (e.g. UE) with CA and/or multi connectivity as per an aspect of an embodiment. FIG. 10B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via an one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 11:
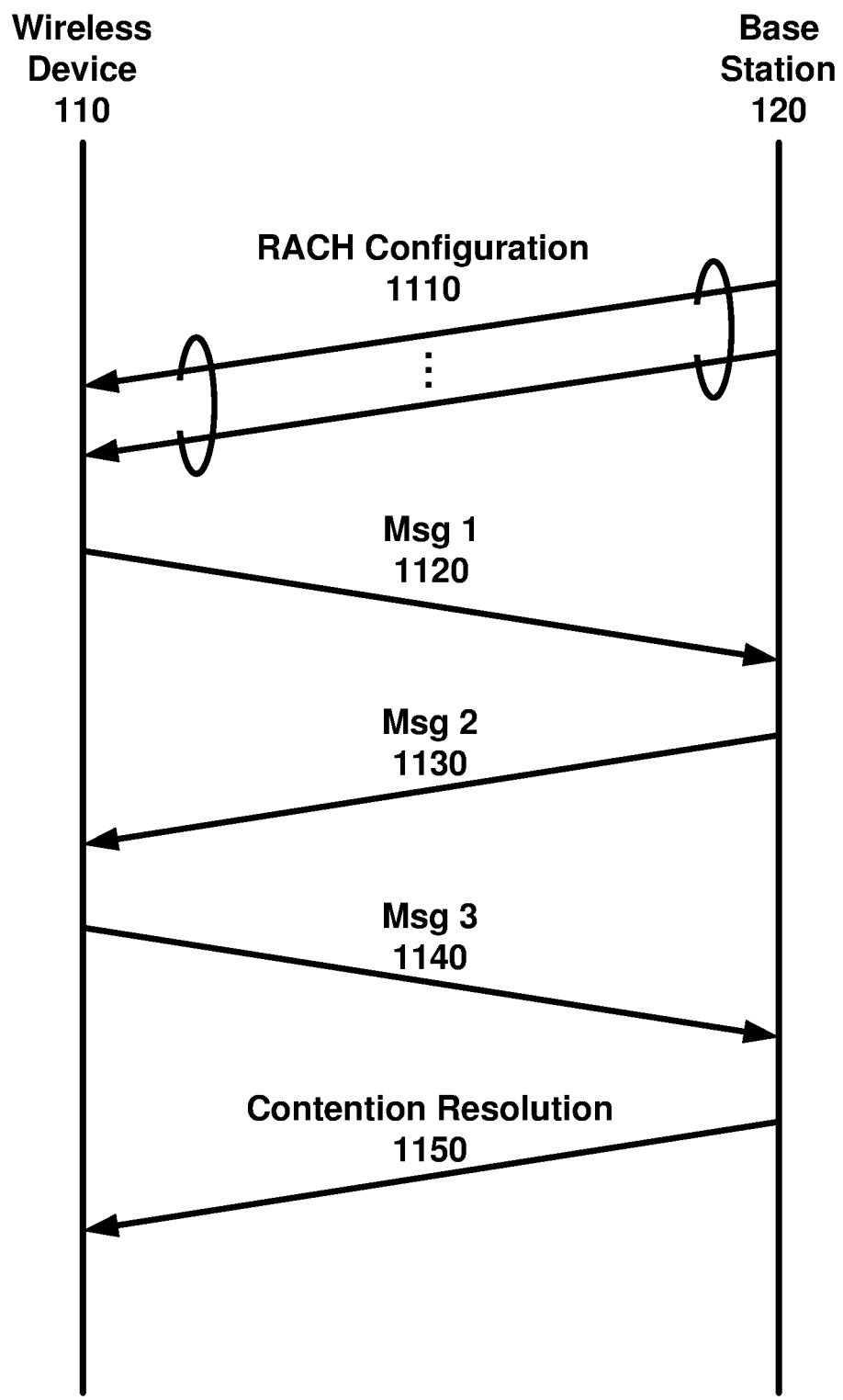
FIG. 11 is a diagram of an example random access procedure as per an aspect of an embodiment of the present disclosure.

FIG. 11 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-Response Window) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 12:
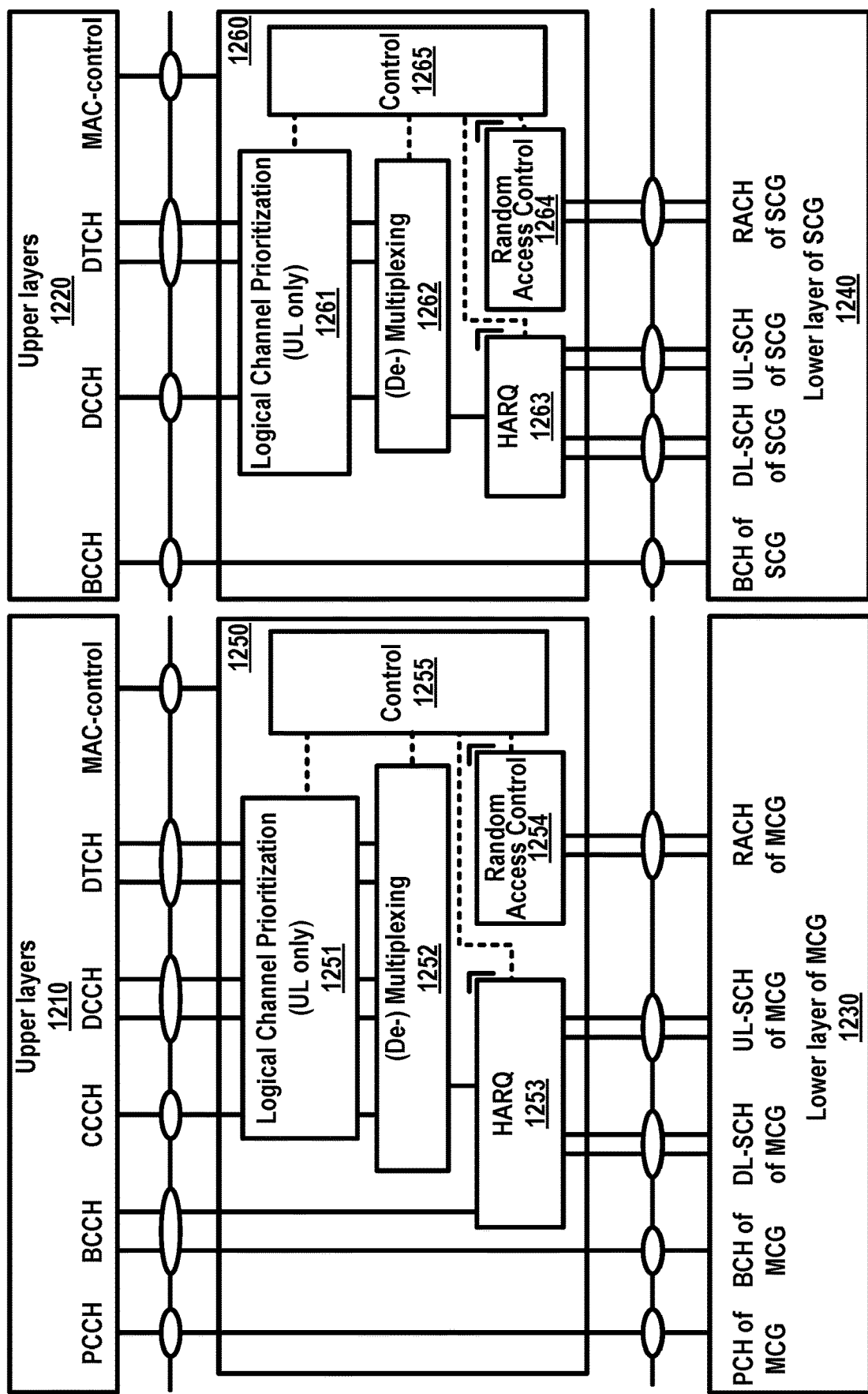
FIG. 12 is a structure of example MAC entities as per an aspect of an embodiment of the present disclosure.
Figure 13:
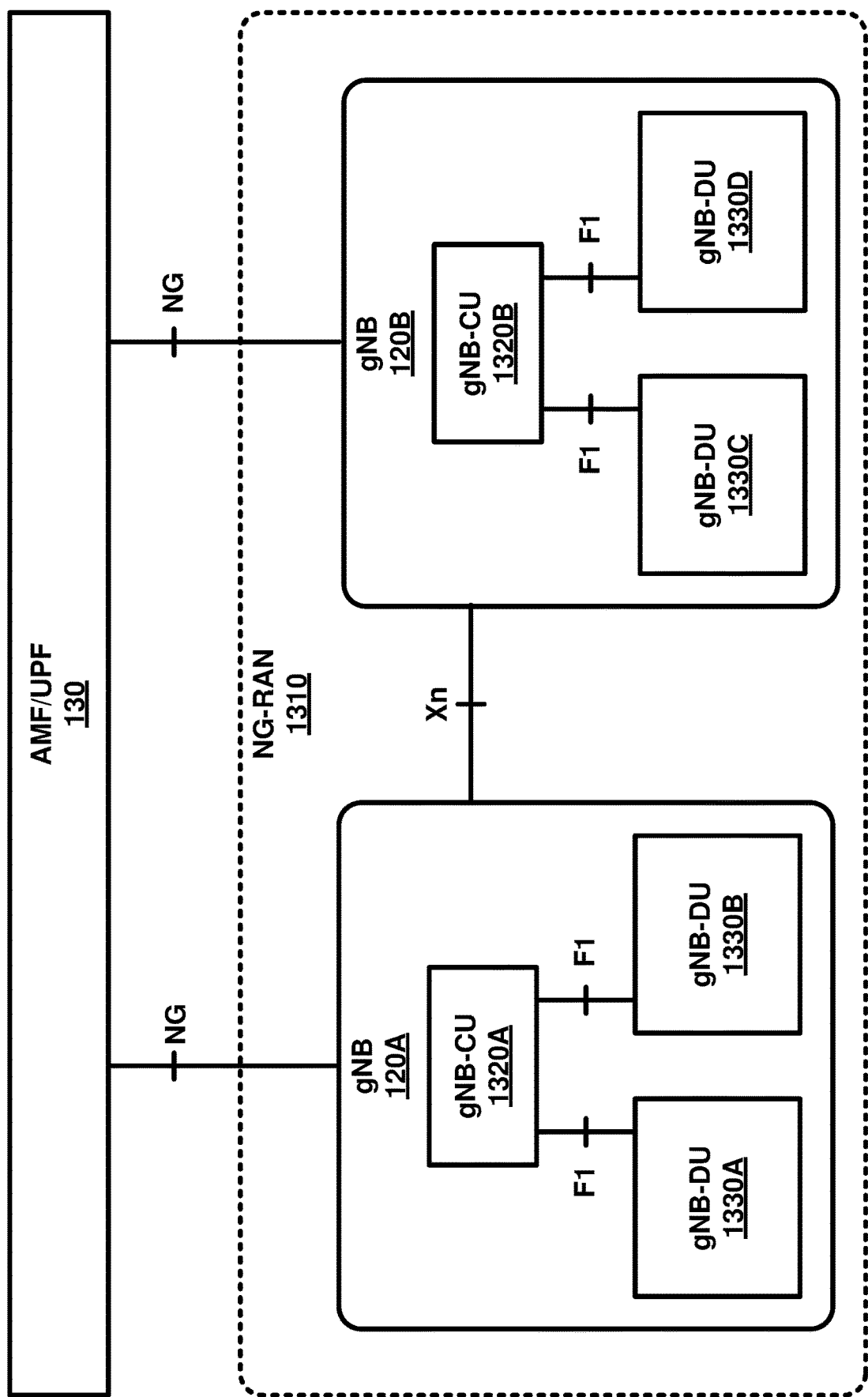
FIG. 13 is a diagram of an example RAN architecture as per an aspect of an embodiment of the present disclosure.

FIG. 12 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

FIG. 13 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 14:
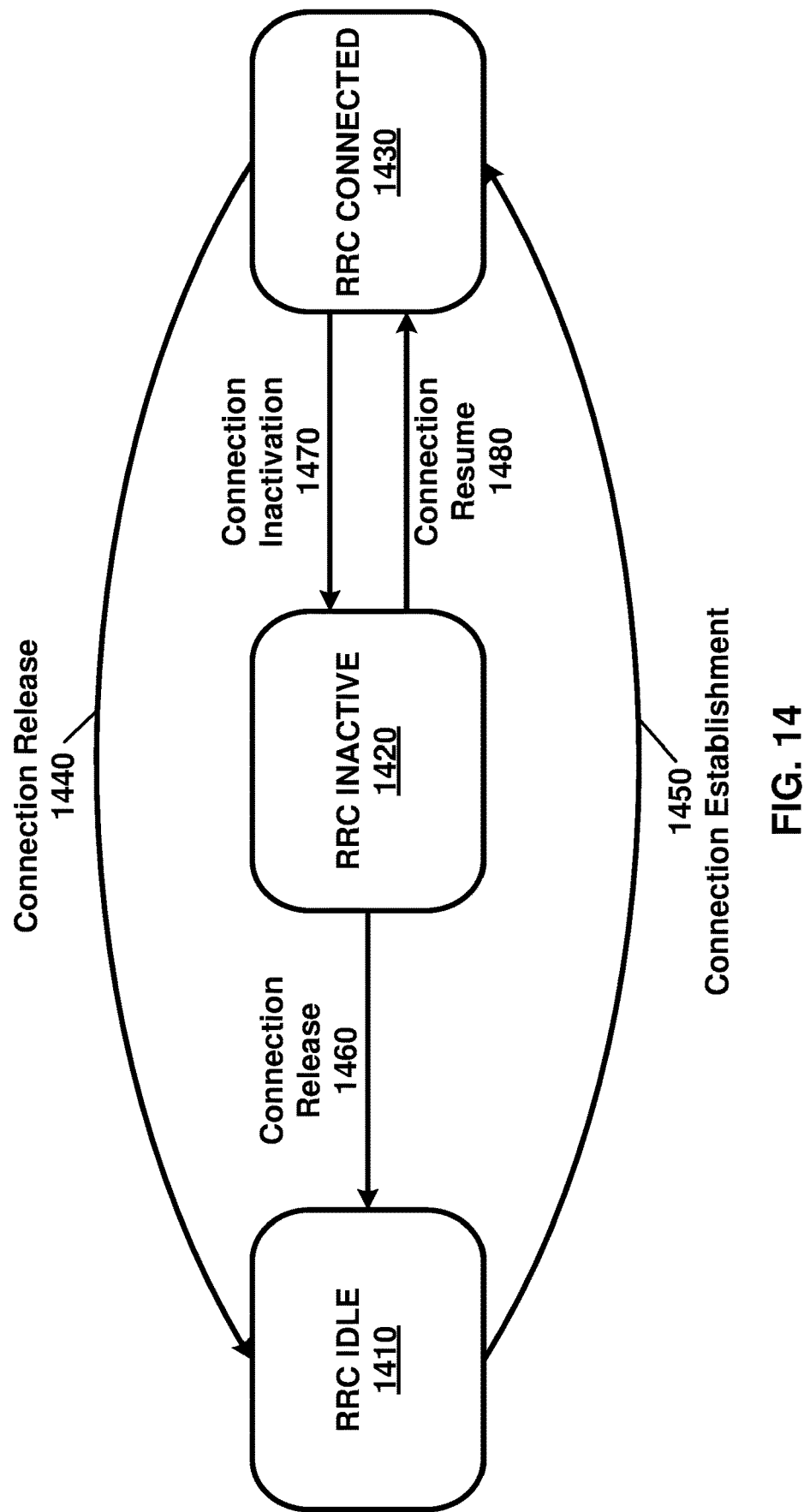
FIG. 14 is a diagram of example RRC states as per an aspect of an embodiment of the present disclosure.

FIG. 14 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

In an example, a base station may control mapping of one or more logical channels (e.g., by the wireless device) to one or more transmission durations and/or numerologies and/or transmission time intervals (TTIs), e.g. TTI durations and/or cells. In an example, base station may configure (e.g., using RRC) a maximum transmission duration for each logical channel in a plurality of logical channels. In an example, the maximum transmission duration may correspond to a maximum PUSCH duration. In an example, the maximum transmission duration may correspond to a maximum duration of a transport block. In an example, a transmission duration may be smaller than or equal to a TTI duration corresponding to the transmission duration. In an example, configuration parameters for a logical channel may comprise an information element indicating the maximum transmission duration and/or maximum PUSCH duration and/or the maximum transport block duration. In an example, the mapping may be semi-static (e.g., with RRC configuration), dynamic (e.g., using physical layer and/or MAC layer signalling), pre-configured at the wireless device, hard split/soft split, etc. In an example, a wireless device may support a plurality of TTIs and/or numerologies from a single cell. In an example, a plurality of TTIs and/or numerologies and/or cells may be handled by a plurality of MAC entities. In an example, the plurality of TTIs and/or numerologies and/or cells may be grouped (e.g., based on band, types of service/QoS, etc.) and a group of TTIs/numerologies/cells may be handled by a MAC entity. In an example, the plurality of TTIs and/or numerologies and/or cells may be handled by a single MAC entity.

In an example, network/gNB may configure a radio bearer to be mapped to one or more numerologies and/or TTI durations and/or transmission durations and/or cells. In an example, a MAC entity may support one or more numerologies and/or TTI durations and/or transmission durations and/or cells. In an example, a logical channel may be mapped to one or more numerologies and/or TTI durations and/or transmission durations and/or cells. In an example, one or more logical channels may be mapped to a numerology and/or TTI duration and/or transmission duration and/or cell. In an example, a HARQ entity may support one or more numerologies and/or TTI durations and/or transmission durations and/or cells.

In an example, a service may be associated with one or more requirements (e.g. power consumption, latency, data rate, coverage, etc.). In an example, the base station may choose or configure a wireless device to choose carrier and/or numerology and/or TTI duration and/or transmission duration such that the one or more requirements are fulfilled. For example, massive machine to machine communication (mMTC) based applications may require enhanced network coverage for low mobility UEs and may be deployed in sub-6 GHz band with extended symbol durations. In an example, enhanced mobile broadband (eMBB) based applications may require high data rate and may exploit the benefits of large spectrum available in above-6 GHz band. In an example, a UE may aggregate a plurality of carriers and/or PHY numerologies supporting different service verticals concurrently.

In LTE, semi-persistent scheduling (SPS) may be applicable to SpCells (e.g., PCell and PSCell). In an example, SpCell may not be deactivated. In an example, SpCell may govern radio link failure (RLF) procedures and may provide a stable link for SPS. In an example, using SpCell to schedule SPS may reduce UE complexities due to cross carrier scheduling, DRX and/or carrier activation/deactivation.

In an example, different services may be considered to support various applications and requirements. In an example, SPS may be supported by a plurality of service verticals. In an example, ultra-reliable low-latency communication (URLLC) based applications may use frequent (e.g., every few symbol, slot, subframe or a plurality of subframes) SPS resources to reduce the user plane latency. In an example, eMBB may require SPS support for HD video streaming, VoIP, etc. In an example, mMTC may use SPS for periodical reporting of events. In an example, SPS may be supported for service verticals operating on different carriers. In an example, SPS may be supported on one or more carriers. In an example, SPS may be supported on a primary carrier.

In LTE, a BSR MAC CE may comprise size of buffers associated with logical channels of one or more logical channel groups (LCGs). In an example, in LTE, there may be maximum four logical channel groups. Logical channel groups may be used to classify different data radio bearers (DRBs) into QoS groups.

In an example, a service vertical may be associated with a plurality of logical channels. In an example, the LTE BSR mechanism may work for NR if a plurality of MAC entities is considered for a plurality of verticals. In an example BSR mechanism may require enhancements for the case that a single MAC entity is used to handle a plurality of service verticals. In an example, a service vertical may be associated with one or more QoS groups. The LTE range of LCGs may not be sufficient to indicate buffer status for different service verticals in NR.

In an example, BSR for a service vertical may be mapped to specific resource allocation. In an example, BSR of a service vertical may be mapped to a HARQ entity. In an example, for downlink and uplink PDCP protocol data unit (PDU), PDCP duplication to more than one logical channel may be used for Carrier Aggregation so that the duplicated PDCP PDUs may be sent over different carriers.

In an example, a numerology may correspond to a sub-carrier spacing in the frequency domain. In an example, by scaling a basic subcarrier spacing by an integer N, different numerologies may be supported. In an example, a TTI duration may correspond to a number of consecutive symbols in the time domain in one transmission direction.

Different TTI durations may be defined when using different number of symbols (e.g. corresponding to a mini-slot, one slot or several slots in one transmission direction). In an example, the combination of one numerology and one TTI duration may determine how transmission is to be made on the physical layer. In an example, which numerologies and/or TTI durations a logical channel corresponding to a radio bearer may be mapped to may be configured and reconfigured via RRC signalling. In an example, the mapping may not be visible to RLC, e.g., the RLC configuration may be per logical channel with no dependency on numerologies and/or TTI durations. In an example, ARQ may operate on a numerology and/or TTI duration the logical channel is configured with. In an example, a single MAC entity may support one or multiple numerologies and/or TTI durations. In an example, logical channel prioritization procedure may take into account the mapping of one logical channel (LCH) to one or more numerologies and/or TTI durations. In an example, HARQ may operate with a plurality of numerologies and TTI durations. In an example, characteristics of the numerology beyond the TTI may be visible to MAC.

In an example, MAC in a gNB may include dynamic resource scheduler that allocate physical layer resources for the downlink and the uplink. In an example, taking into account the UE buffer status and the QoS requirements of each UE and associated radio bearers, schedulers may assign resources between UEs. In an example, schedulers may assign resources taking into account the radio conditions at the UE identified through measurements made at the gNB and/or reported by the UE. In an example, schedulers may assign radio resources in a unit of TTI (e.g. one mini-slot, one slot, or multiple slots). Resource assignment may consist of radio resources (e.g., resource blocks). In an example, semi-persistent scheduling (SPS) may be supported. In an example, the UE may skip UL grant if there is no data in the buffer rather than sending a padding BSR. In an example, UEs may identify the resources by receiving a scheduling (resource assignment) channel. In an example, measurement reports may be required to enable the scheduler to operate in both uplink and downlink. These may include transport volume and measurements of a UEs radio environment. In an example, uplink buffer status reports may be needed to provide support for QoS-aware packet scheduling. Uplink buffer status reports may refer to the data that is buffered in the logical channel queues in the UE. The uplink packet scheduler in the eNB may be located at MAC level. The buffer reporting scheme used in uplink may be flexible to support different types of data services. Constraints on how often uplink buffer reports are signalled from the UEs can be specified by the network to limit the overhead from sending the reports in the uplink.

In an example, to provide uplink grant for a TTI and/or transmission duration and/or numerology and/or cell, the UE may provide indication of logical channels for which uplink grant is required and are mapped to the TTI and/or numerology and/or cell. In an example, the base station may provide an uplink grant corresponding to default TTI and/or numerology and/or cell after receiving a scheduling request from a wireless device. In an example, NR scheduling request mechanism may indicate the logical channels or TTI and/or transmission duration and/or numerology for which uplink grant is required. In an example, logical channel ID and/or logical channel group ID and/or TTI and/or transmission duration and/or numerology along with scheduling request may be provided by the wireless device. In an example, scheduling request resource may be for a given TTI and/or transmission duration and/or numerology or one or more (e.g., group of) logical channels. In an example, the NR scheduling request may indicate the TTI and/or transmission duration and/or numerology for which uplink grant is required.

In an example, radio link failure may occur on one or more carriers. In an example, radio link failure may occur in a primary carrier, and one or more of the non-primary carriers which are not affected by RLF may perform one or more primary carrier operations/procedures. In an example, a connection re-establishment procedure may resume connection to one of the secondary carriers if available.

In an example, different TTI and/or transmission durations may be configured for NR (e.g., one or more symbols, one or more mini-slots, or more slots). In an example, eMBB traffic may be pre-empted by URLLC transmissions. In an example, the gNB MAC may dynamically schedule physical layer resources for the downlink and the uplink. In an example, considering the traffic volume and the QoS requirements of a UE and associated radio bearers, gNB scheduler may assign resources. In an example, gNB scheduler may assign resources considering the radio conditions at the UE identified through measurements made at the gNB and/or reported by the UE.

In an example, radio resource allocations may be valid for (or indicate resources for) a TTI (e.g. one or more symbols, one or more mini-slots, one or more slots). In an example, radio resource allocation may indicate resources for a plurality of TTIs. The resource assignment may comprise indication of radio resources (e.g., resource blocks). In an example, in the downlink, the gNB may pre-empt existing resource allocations to accommodate latency critical data. In an example, a UE may identify the resources by receiving a scheduling (resource assignment) channel. In an example, measurement reports may enable the scheduler to operate in uplink and downlink. The measurements may include transport volume and measurements of a UEs radio environment.

In an example, uplink buffer status reports may provide support for QoS-aware packet scheduling. In an example, uplink buffer status reports may refer to the data that is buffered in the logical channel queues in the UE. In an example, the uplink packet scheduler in the gNB may be located at MAC level. In an example, the buffer status reporting scheme used in uplink may be flexible to support different types of data services. In an example, constraints on how often uplink buffer reports are signalled from the UEs may be configured at the UE by the network/gNB to limit the overhead.

In LTE, scheduling requests (SRs) may be used for requesting UL-SCH resources for new transmissions when a UE has no valid grant. In an example, if SR resources are not configured for the UE, the UE may initiate a Random Access procedure in order to receive a scheduling grant in uplink. In LTE, SR may comprise one bit of information and may indicate that the UE needs an uplink grant. In an example, upon the reception of a one-bit SR, gNB may not know which logical channel (associated with certain QCI) has data available for transmission, or the amount of data available for transmission at the UE. In an example, gNB may indicate the numerology and/or transmission duration and/or TTI duration in the grant. In an example, the UE may indicate to the gNB the desired numerology and/or transmission duration and/or TTI duration.

In an example, SR and/or BSR may report UE buffer status of one or more logical channels and/or logical channel groups (priority and/or the buffer size) and/or numerology/TTI duration/transmission duration. In an example, SR may indicate the type of LCG with available data, and/or the amount of available data associated with the LCG. In an example, by indicating the amount of available data associated with the LCG that needs grant at the UE, gNB may provide suitable grant size on the preferred numerology/TTI duration/transmission duration to the UE. In an example, to avoid the delay caused by BSR grant allocation, grant-free transmission of BSR without sending an SR may be supported.

In an example, grant-free transmission mechanisms may be used for delay critical use cases such as URLLC. In an example, UE-specific resource allocation may be used for BSR transmission. In an example, if grant-free transmissions are supported, the wireless device may transmit BSR per logical channel and/or logical channel group and/or short BSR. In an example, the buffer status report for high priority traffic may be transmitted using the grant-free channel. In an example, the grant-free resources assigned per UE may be used for transmission of BSR only. In an example, the grant-free resources assigned per UE may be used for transmission of BSR and data. In an example, the grant-free resources may be utilized for transmission of data, if there is no BSR pending for transmission.

In LTE, the UE may transmit a BSR when there is new data available in the buffer with higher priority than the existing data, while the UE may not be allowed to transmit a BSR if the new data has the same or lower priority than the existing data. This may lead to information mismatch between the UE and gNB, resulting in a long unnecessary scheduling delay until the UE can empty its transmission buffer.

In an example, the UE may transmit BSR when new data becomes regardless of its priority. In an example, the gNB may configure the UE to transmit BSR when new data becomes available regardless of its priority.

Figure 15:
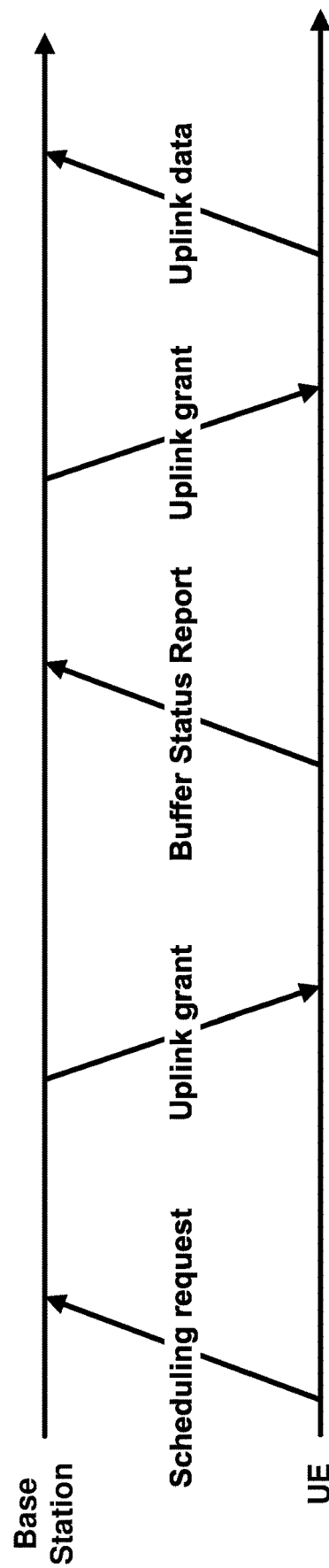
FIG. 15 is a diagram of example scheduling procedure as per an aspect of an embodiment of the present disclosure.

Example uplink scheduling procedure in LTE is shown in FIG. 15. In an example, scheduling request (SR) may be used for requesting UL-SCH resources for new transmission. In an example, SR may be triggered when a regular buffer status report (BSR) is triggered and UE doesn't have resources for transmission for at least the regular BSR. In an example, regular BSR may be triggered when data becomes available for transmission in the uplink.

In an example in LTE, SR may be transmitted on physical uplink control channel (PUCCH) and may be configured with one bit to save control channel overhead. SR may be used to inform the eNB that there is new data in one or more buffers associated with the UE's logical channels. The eNB may schedule some resources and may indicate to UE in the downlink control information (DCI) as uplink grant after the SR is received. The UE may transmit BSR on the uplink grant if logical channel buffers are not empty and the eNB may schedule the UE with new resources.

In an example, NR may support different service requirements, such as eMBB, URLLC, etc. Uplink data may have critical delay requirement (e.g., URLLC). In an example, gNB may need to know such requirement for efficient scheduling, because eMBB and URLLC may have different physical layer scheduling procedure and channel structure.

In an example, multi-bits scheduling request (SR) may be configured for a wireless device. In an example, UE-specific SR size and/or resources may be configured. In an example, different UEs may have services with different QoS requirements. In an example, for one or more the services (e.g., with high data rate such as eMBB), a combination of SR and BSR may be used. In an example, a UE with delay-critical service and small packets may be configured with multi-bits SR to indicate the buffer size. The network/gNB may schedule a grant with proper size so that all data can be transmitted in one round of signaling. In an example, a mapping may be configured between the size of SR and the type of services required by the UE. In an example, using SR and/or BSR and/or a combination of SR and BSR, the network/gNB may allocate a suitable TTI/transmission duration/numerology for the services the UE requests. In an example, for a type of service, a different value of the SR may indicate different buffer size of the service.

In an example, the network/gNB may enable/disable BSR and/or SR (e.g., one-bit SR or multi-bits SR) using RRC configuration and/or dynamic signaling (e.g., PHY and/or MAC signaling). In an example, triggering conditions for BSR may change depending on if the network/gNB has enabled SR (e.g., multi-bit SR) at the UE or not. In an example, if multi-bits SR is configured, BSR may be disabled or the triggering conditions may change.

In an example, grant-free transmission of BSR may be configured. In an example, the network/gNB may pre-configure the resources for transmitting the grant-free BSR.

In an example, SR may comprise a plurality of bits. In an example, SR may provide information about one or more logical channels and/or logical channel groups and/or TTI/transmission duration/numerology that the UE may need grant for. In an example, multi-bits SR may indicate a type of LCG which has data available, and/or the amount of available data associated with the LCG. In an example, the periodicity of SR resources may be shorter for URLLC data to support fast scheduling. In an example, the SR resources may be application-type specific and/or transmission of SR (e.g., SR resource) may indicate the type of grant (e.g., the TTI/numerology) that the UE is expecting.

In an example in LTE, a Regular BSR may be triggered when new data becomes available and either the data belongs to a logical channel with higher priority than the priorities of the logical channels which belong to any LCG and for which data is already available for transmission, or there is no data available for transmission for any of the logical channels which belong to a LCG. In an example in LTE, the UE may not trigger a BSR if the new data has the same or lower priority than the existing data.

In an example in LTE, BSR MAC control elements may comprise Short/Truncated BSR format with one LCG ID field and one corresponding Buffer Size field and Long BSR format with four LCG IDs and corresponding Buffer Size fields. In an example, a logical channel may be mapped to a numerology/TTI duration based on one or more criteria (e.g. UE capability, service requirements, QoS, . . . ).

In an example, grant-free uplink resource may be dedicated for a UE. In an example, if dedicated grant-free resource is allocated to a UE and the grant-free resource is frequent/dense enough for satisfying latency requirements, the UE may not need SR to request resource for data and BSR. In an example, the grant-free resource allocated to a UE may be contention based. In an example, the grant-free resources allocated to a UE may not be dense enough to fulfil ultra-low latency requirements of URLLC. In an example, a UE may need SR procedure for supporting URLLC. In an example, SR may indicate information about data pending in the UE.

In an example, gNB may group logical channels into one or more logical channel groups (LCGs) at the UE and the UE may report buffer status of one or more LCGs. In an example, the UE may report buffer status per logical channel. In an example, gNB may group logical channels into one or more logical channel groups (LCGs) at the UE. The UE may report buffer status of one or more LCGs and/or one or more logical channels (e.g., URLLC logical channels).

In an example, gNB may indicate mapping between one or more logical channel and one or more numerology and/or TTI duration and/or transmission duration. In an example, one or more logical channel may be mapped to a numerology and/or TTI duration and/or transmission duration. In an example, a UE may report buffer status per numerology/TTI duration/transmission duration.

In an example in NR, a UE may multiplex data from a subset of logical channels into a MAC PDU (e.g., for better support of QoS). In an example, one MAC PDU may comprise of data from one or more logical channels (e.g., with the same QoS). In an example, gNB may include only one logical channel in a LCG. In an example, only the logical channels with the same QoS may be grouped to one LCG. In an example in NR, BSR may support scheduling with fine granularity, e.g., scheduling per logical channel or per QoS.

In an example, UE may report PDCP data amount and RLC data amount separately when reporting the buffer status. By having PDCP data amount separately, a scheduler, e.g., eNB/gNB, may allocate uplink resource without tight coordination by having a general principle in scheduling PDCP data. In an example, reporting PDCP data amount separately may be beneficial in case of multi-split bearer. For example, for multi-split bearer, some eNB/gNBs may mainly serve the multi-split bearer to avoid resource waste. In this case, reporting PDCP data amount only to some eNB/gNBs, coordination effort may be reduced.

In an example, a logical channel may be mapped to one or more numerology and/or TTI duration/transmission duration. In an example, ARQ may be performed on numerologies and/or TTI durations that the logical channel (LCH) may be mapped to. In an example, the RLC configuration may be per logical channel without dependency on numerology/TTI length. In an example, logical channel to numerology/TTI length mapping may be reconfigured via RRC reconfiguration. In an example, HARQ retransmission may be performed across different numerologies and/or TTI durations. In an example, HARQ configuration may be numerology/TTI duration specific.

In an example, a MAC entity may support one or more numerology/TTI duration/transmission duration. In an example, logical channel prioritization (LCP) may consider the mapping of logical channel to one or more numerology/TTI duration. In an example in NR, a first BSR format may be associated with URLLC service and a second BSR format may be associated with eMBB or mMTC services. In an example, a first SR format may be associated with larger grant size request and a second SR format may be used for a smaller grant size request. In an example, BSR may support reporting a selective number of LCGs and/or LCs to a gNB. In an example, NR may support dynamic scheduling, semi-persistent scheduling and grant-less uplink transmissions. In an example, scheduling function may support dynamic and semi-static switching between resources corresponding to different numerologies for a UE.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one or messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an example, data from a packet data convergence protocol (PDCP) entity corresponding to a bearer may be duplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by two or more MAC entities. In an example, a logical channel may be scheduled by one of a plurality of MAC entities. In an example, the one or more bearers may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra-reliable low-latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/transmission durations/numerologies. In an example, a logical channel may not be mapped to one or more of the plurality of TTIs/transmission durations/numerologies. In an example, a logical channel corresponding to a URLLC bearer may be mapped to one or more first TTIs/transmission durations and a logical corresponding to an eMBB application may be mapped to one or more second TTIs/transmission durations, wherein the one or more first TTIs/transmission durations may have shorter duration than the one or more second TTIs/transmission durations. In an example, the plurality of TTIs/transmission durations/numerologies may be pre-configured at the wireless device. In an example, the one or more messages may comprise the configuration parameters of the plurality of TTIs/transmission durations/numerologies. In an example, a base station may transmit a grant to a wireless device, wherein the grant comprises indication of a cell and/or a TTI/transmission duration/numerology that the wireless device may transmit data. In an example, a first field in the grant may indicate the cell and a second field in the grant may indicate the TTI/transmission duration/numerology. In an example, a field in the grant may indicate both the cell and the TTI/transmission duration/numerology.

In an example, the one or more messages may comprise a logical channel group identifier for one or more of the plurality of the logical channels. In an example, one or more of the plurality of logical channels may be assigned a logical channel group identifier n, e.g., 0<n<N (e.g., N=3, or 5, or 7, or 11 or 15, etc.). In an example, the one or more of the plurality of logical channels with the logical channel group identifier may be mapped to a same one or more TTIs/transmission durations/numerologies. In an example, the one or more of the plurality of logical channels with the logical channel group identifier may only be mapped to a same one or more TTIs/transmission durations/numerologies. In an example, the one more of the plurality of logical channels may correspond to a same application and/or QoS requirements. In an example, one or more first logical channels may be assigned logical channel identifier(s) and logical channel group identifier(s) and one or more second logical channels may be assigned logical channel identifier (s). In an example, a logical channel group may comprise of one logical channel.

In an example, the one or more messages may comprise one or more first fields indicating mapping between the plurality of logical channels and the plurality of TTIs/transmission durations/numerologies and/or cells. In an example, the one or more first fields may comprise a first value indicating a logical channel is mapped to one or more first TTI/transmission duration shorter than or equal to the first value. In an example, the one or more first fields may comprise a second value indicating a logical channel is mapped to one or more second TTI/transmission durations longer than or equal to the second value. In an example, the one or more first fields may comprise and/or indicate one or more TTIs/transmission durations/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/transmission duration/numerology and/or cell. In an example, if a value of 0 in the bitmap associated with a logical channel may indicate that the logical channel is not mapped to a corresponding TTI/transmission duration/numerology and/or cell. In an example, the one or more messages may comprise configuration parameters for the plurality of the logical channels. In an example, the configuration parameters for a logical channel may comprise an associated bitmap for the logical channel wherein the bitmap indicates the mapping between the logical channel and the plurality of TTIs/transmission durations/numerologies and/or cells.

In an example, a first logical channel may be assigned at least a first logical channel priority. In an example, the first logical channel may be assigned one or more logical channel priorities for one or more TTIs/transmission durations/numerologies. In an example, the first logical channel may be assigned a logical channel priority for each of the plurality of TTIs/transmission durations/numerologies. In an example, a logical channel may be assigned a logical channel priority for each of one or more of the plurality of TTIs/transmission durations/numerologies. In an example, a logical channel may be assigned a logical channel priority for each of one or more TTIs/transmission durations/numerologies wherein the logical channel is mapped to the each of the one or more TTIs/transmission durations/numerologies. In an example, the one or more messages may comprise one or more second fields indicating priorities of a logical channel on one or more TTIs/transmission durations/numerologies. In an example, the one or more second fields may comprise one or more sequences indicating priorities of a logical channel on one or more TTIs/transmission durations/numerologies. In an example, the one or more second fields may comprise a plurality of sequences for the plurality of logical channels. A sequence corresponding to a logical channel may indicate the priorities of the logical channel on the plurality of TTIs/transmission durations/numerologies/cells or one or more of the plurality of TTIs/transmission durations/numerologies/cells. In an example, the priorities may indicate mapping between a logical channel and one or more TTIs/transmission durations/numerologies. In an example, a priority of a logical channel with a given value (e.g., zero or minus infinity or a negative value) for a TTI/numerology may indicate that the logical channel is not mapped to the TTI/numerology. In an example, sizes of the sequence may be variable. In an example, a size of a sequence associated with a logical channel may be a number of TTIs/transmission durations/numerologies to which the logical channel is mapped. In an example, the sizes of the sequence may be fixed, e.g., the number of TTIs/transmission durations/numerologies/cells.

The buffer status report of a wireless device provides information to a base station for efficient scheduling of the wireless device and enhanced air interface throughput, delay and performance. A wireless device transmits a buffer status report to the base station in response to the wireless device having an uplink grant and a buffer status report being pending. The wireless device triggers a buffer status report in response to one or more events. For example, in LTE, when data arrives for a logical channel and the logical channel has higher priority than other logical channels with available data, a buffer status report is triggered. In an example, in new radio (NR) radio access technology, a logical channel may be mapped to a plurality of TTIs/transmission durations/numerologist/cells and may have at least one logical channel priority. In an example, a logical channel may have a plurality of logical channel priorities (e.g., on a plurality of TTIs/transmission durations/numerologies/cells). Existing BSR triggering mechanisms may not trigger BSR in some example scenarios when BSR is needed and/or may result in excessive triggering of BSR transmission in some other scenarios. An efficient buffer status reporting procedure is needed to ensure a wireless device is scheduled to transmit data in a timely manner and with appropriate grants (e.g., appropriate size, TTI/transmission duration/numerology). An inefficient BSR procedure leads to degradation of wireless device and network performance specially for delay-sensitive applications. There is a need to enhance methods and systems for triggering of buffer status report in a wireless network. Example embodiments employ mapping to and/or priority (priorities) of a logical channel on one or more TTIs/transmission durations/numerologies in triggering of buffer status report at the wireless device and enhance the scheduling efficiency and wireless device and wireless network performance, for example, in terms of throughput and delay.

In an example embodiment, a MAC entity may trigger a buffer status report (BSR) when uplink data becomes available for an uplink buffer associated with a first logical channel and the first logical channel has a higher priority on a TTI/transmission duration/numerology of the one or more TTIs/transmission durations/numerologies than one or more priorities, on the TTI/transmission duration/numerology, of a selected one or more logical channels, wherein the selected one or more logical channels are selected if the one or more logical channels are mapped at least to the TTI/transmission duration/numerology. In an example, the uplink buffer associated with the first logical channel may be an uplink buffer associated with the radio link control (RLC) entity and/or a packet data convergence protocol (PDCP) entity associated with the first logical channel. In an example, the wireless device may receive an uplink grant from a base station comprising transmission parameters (e.g., transmission time/resources, MCS, HARQ parameters, power control command, etc.). In an example, the wireless device may transmit the BSR to the base station using the resources provided by the grant. In an example, the uplink buffer may be empty when the uplink data becomes available. In an example, the uplink buffer may comprise one or more uplink packets when the uplink data becomes available.

In an example, the BSR may comprise buffer status of the plurality of the logical channels. In an example, the BSR may comprise buffer status of one or more groups of the plurality of logical channels. In an example, the BSR may comprise buffer status of one or more first logical channels and buffer status of one or more first groups of the plurality of the logical channels. In an example, the BSR may comprise buffer status of one or more first logical channels corresponding to one or more first application types (e.g., URLLC and/or mMTC) and buffer status of one or more first groups of the plurality of the logical channels corresponding to one or more second application types (e.g., eMBB). In an example, the base station may configure the wireless device with one or more of a plurality of BSR formats. In an example, the plurality of BSR formats may be pre-configured at the wireless device. In an example, a first BSR format may comprise buffer status of the plurality of the logical channels. In an example, a second BSR format may comprise buffer status of one or more groups of the plurality of logical channels. In an example, a third BSR format may comprise buffer status of one or more first logical channels and buffer status of one or more first groups of the plurality of the logical channels.

In an example, the BSR may be one of a short format and a long format and/or other formats. In an example, the BSR may have a variable size. In an example, the size of BSR may depend on at least one of a first number of logical channels with available data and/or a second number of logical channel groups with available data. In an example, variable-size BSR format may comprise indication of logical channel(s) and/or logical channel group(s) for which the buffer status is(are) included in the BSR. In an example, the indication may be one or more bitmaps. In an example, a value of one in the one or more bitmaps may indicate that a corresponding logical channel and/or logical channel group is included in the BSR. In an example, a value of zero in the one or more bitmaps may indicate that a corresponding logical channel and/or logical channel group is not included in the BSR. In an example, the variable-size BSR format may correspond to a MAC subheader without length field (e.g., fixed-size MAC subheader with no Length (L) field) and may comprise indication of BSR size (e.g., the one or more bitmap and/or other indication) in the BSR. In an example, the variable-size BSR format may correspond to a MAC subheader with length field (e.g., variable-size MAC subheader with Length (L) field). In an example, the L field may indicate the number of logical channels and/or logical channel groups for which buffer status is(are) included in the BSR. In an example, the L field may indicate the number of octets in the BSR. In an example, the BSR may comprise one or more logical channel identifiers and/or one or more logical channel group identifiers and buffer status corresponding to the one or more logical channels and/or the one or more logical channel groups.

In an example embodiment, a wireless device may receive one or more messages comprising a logical channel identifier for each of a plurality of logical channels, wherein a first logical channel in the plurality of logical channels is mapped to one or more transmission time intervals (TTIs)/transmission durations/numerologies of a plurality of transmission time intervals (TTIs)/transmission durations/numerologies and is assigned at least one first logical channel priority. An example is shown in the FIG. 16. In an example, a MAC entity may trigger a buffer status report (BSR) when uplink data becomes available for an uplink buffer associated with the first logical channel and the first logical channel has a higher priority for a TTI/transmission duration/numerology of the one or more TTIs/transmission durations/numerologies than one or more priorities, on the TTI/transmission duration/numerology, of a selected one or more logical channels, wherein the selected one or more logical channels are selected if the one or more logical channels are mapped at least to the TTI/transmission duration/numerology. In an example, the uplink buffer associated with the first logical channel may be an uplink buffer associated with the radio link control (RLC) entity and/or a packet data convergence protocol (PDCP) entity associated with the first logical channel. In an example, the wireless device may receive an uplink grant from a base station comprising transmission parameters (e.g., transmission time/resources, MCS, HARQ parameters, power control command, etc.). In an example, the wireless device may transmit the BSR to the base station using the resources provided by the grant. In an example, the uplink buffer may be empty when the uplink data becomes available. In an example, the uplink buffer may comprise one or more uplink packets when the uplink data becomes available.

Figure 16:
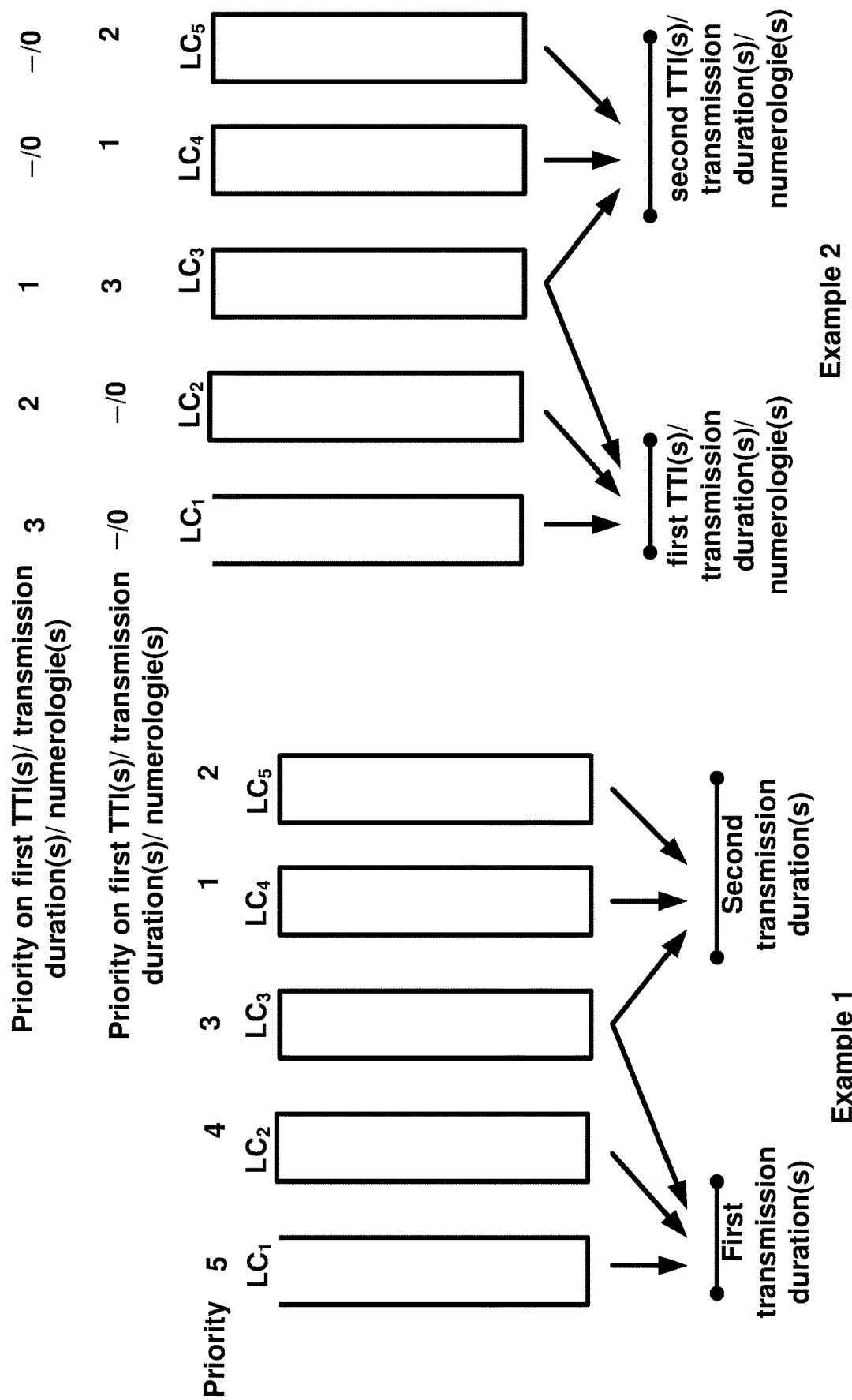
FIG. 16 is a diagram of example logical channel mappings as per an aspect of an embodiment of the present disclosure.

For the example 1 in FIG. 16, a logical channel is assigned a priority and is mapped to one or more transmission durations. In an example, data becomes available in buffer associated with LC3. LC3 may be mapped to one or more first transmission durations and one or more second transmission durations. In an example, LC3 may have higher priority than other logical channels mapped to the one or more first transmission durations. In an example, LC3 may have higher priority than other logical channels with available data mapped to the one or more first transmission durations. In an example, LC3 may have higher priority than other logical channels with available data mapped to the one or more first transmission durations but may not have higher priority than other logical channels mapped to the one or more second transmission durations. The wireless device may trigger BSR in response to data becoming available to LC3 and LC3 having higher priority than priorities of logical channels with available mapped to the one or more first transmission durations or in response to LC3 having higher priority than logical channels with available data mapped to the one or more second transmission durations. For the example 2 in the FIG. 16, a logical channel may have a priority in one or more TTIs/first transmission durations/numerologies. In an example, a logical channel priority of 0 on a TTI/transmission duration/numerology may indicate that the logical channel is not mapped to the TTI/transmission duration/numerology. A logical channel may have a priority in each TTI/transmission duration/numerology that the logical channel is mapped to (for example, first TTI(s)/transmission duration(s)/numerologie(s) and second first TTI(s)/transmission duration(s)/numerologie(s) in FIG. 16). If LC2 and LC4 have data available in their associated buffers and data becomes available for the buffer associated with LC3, since it has higher priority in first TTI(s)/transmission duration(s)/numerologie(s) (although not in second TTI(s)/transmission duration(s)/numerologie(s)), the wireless device may trigger a BSR.

In an example embodiment, a wireless device may receive one or more messages comprising one or more fields indicating priorities of one or more logical channels on one or more transmission time intervals (TTIs)/transmission durations/numerologies. In an example, a logical channel priority on a TTI/transmission duration/numerology may indicate whether the logical channel may be mapped to the TTI/transmission duration/numerology. In an example, a value of zero or minus infinity or a negative value for a logical channel priority may indicate that the logical channel may not be mapped to the TTI/transmission duration/numerology. In an example, the one or more message may comprise one or more fields indicating mapping between the one or more logical channel and the one or more TTIs/transmission durations/numerologies. In an example, a MAC entity may trigger a buffer status report (BSR) when uplink data becomes available for an uplink buffer associated with a logical channel and for at least one TTI/transmission duration/numerology, the logical channel has higher priority than priorities of one or more first logical channels with available data. In an example, the uplink buffer associated with the logical channel may be an uplink buffer associated with the radio link control (RLC) entity and/or a packet data convergence protocol (PDCP) entity associated with the logical channel. In an example, the wireless device may receive an uplink grant from a base station comprising transmission parameters (e.g., transmission time/resources, MCS, HARQ parameters, power control command, etc.). In an example, the wireless device may transmit the BSR to the base station using the resources provided by the grant. In an example, the uplink buffer may be empty when the uplink data becomes available. In an example, the uplink buffer may comprise one or more uplink packets when the uplink data becomes available.

In an example embodiment, a wireless device may receive one or more messages comprising one or more fields indicating priorities of one or more logical channels on one or more transmission time intervals (TTIs)/transmission durations/numerologies. In an example, a logical channel priority on a TTI/transmission duration/numerology may indicate whether the logical channel may be mapped to the TTI/transmission duration/numerology. In an example, a value of zero or minus infinity or a negative value for a logical channel priority may indicate that the logical channel may not be mapped to the TTI/transmission duration/numerology. In an example, the one or more message may comprise one or more fields that indicate mapping between the one or more logical channel and the one or more TTIs/transmission durations/numerologies. In an example, a MAC entity may trigger a buffer status report (BSR) considering the priorities of the one or more logical channels on a first TTI/transmission duration/numerology. In an example, the first TTI/transmission duration/numerology may be pre-configured at the wireless device and/or may be a default TTI/transmission duration/numerology. In an example, the default TTI/transmission duration/numerology may be the LTE TTI/transmission duration/numerology. In an example, the one or more messages may comprise configuration parameters for the first TTI/transmission duration/numerology. In an example, the wireless device may receive an uplink grant from a base station comprising transmission parameters (e.g., transmission time/resources, MCS, HARQ parameters, power control command, etc.). In an example, the wireless device may transmit the BSR to the base station using the resources provided by the grant.

In an example embodiment, a wireless device may receive one or more messages comprising one or more fields indicating priorities of one or more logical channels, the priorities being independent of a plurality of transmission time intervals (TTIs)/transmission durations/numerologies configured for the wireless device, e.g., a logical channel may have one priority for the plurality of TTIs/numerologies. In an example, the MAC entity may trigger buffer status report (BSR) considering the priorities. The wireless device may receive a grant for transmission on a TTI/transmission duration/numerology. The wireless device may transmit the BSR on the TTI/transmission duration/numerology.

Figure 17A:
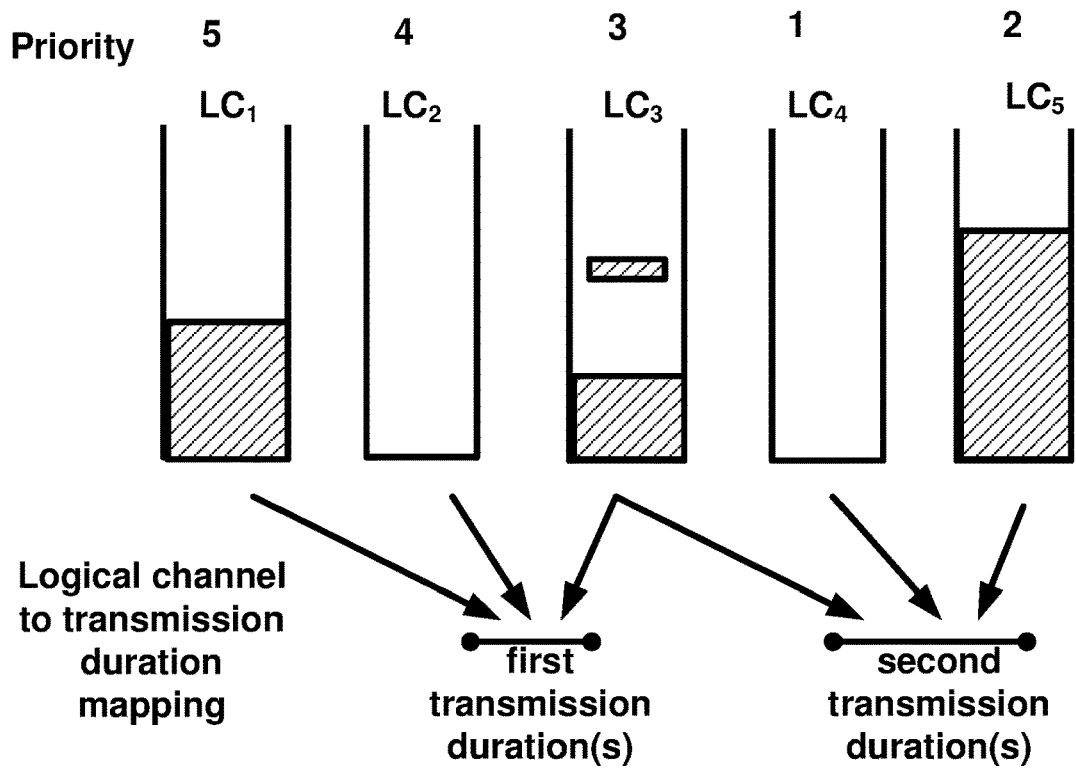
FIG. 17A and FIG. 17B are diagrams of example BSR triggering as per an aspect of an embodiment of the present disclosure.
Figure 17B:
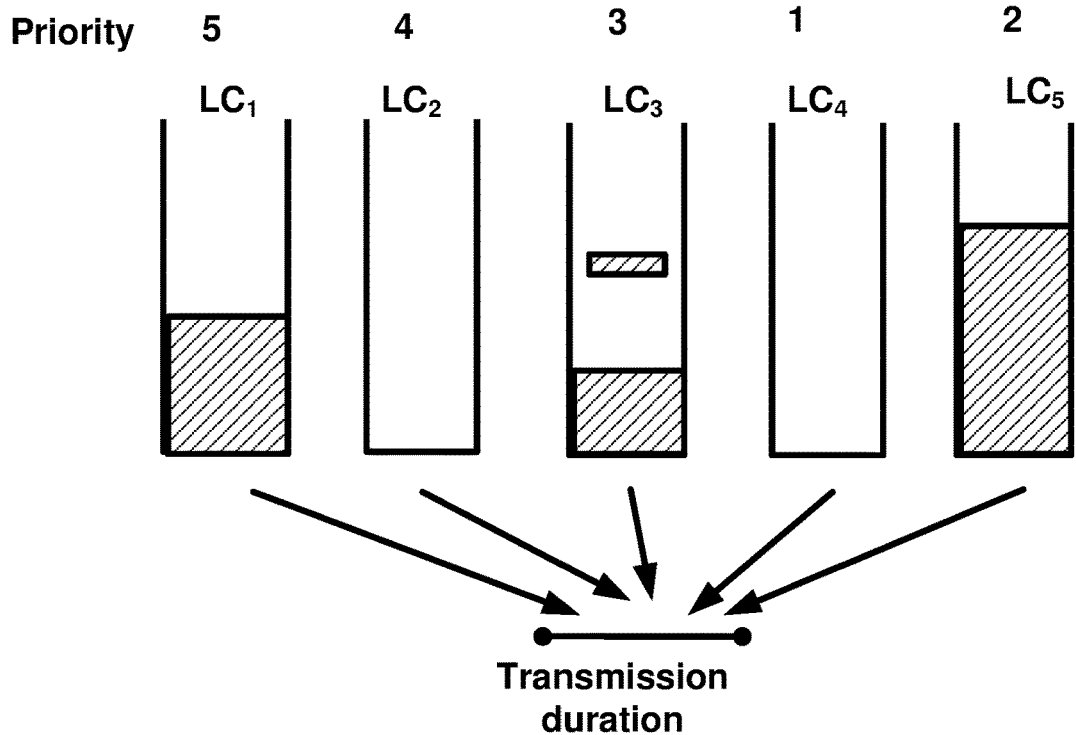

In an example embodiment, as shown in FIG. 17A, a wireless device may receive configuration parameters for a plurality of logical channels. The plurality of logical channels may comprise a first plurality of logical channels comprising a first logical channel. In an example, the first logical channel may have a first logical channel priority. In an example, the configuration parameters may indicate logical channel priorities for the plurality of logical channels. In an example, the first logical channel may be mapped to one or more first transmission durations. In an example, uplink data may become available to the first logical channel. In an example, the first plurality of logical channels in the plurality of logical channels may have uplink data in their associated buffers. In an example, the wireless device may trigger a buffer status report in response to uplink data becoming available to the first logical channel in the first plurality of logical channels with uplink data and the first logical channel priority being higher than one or more priorities of one or more selected logical channels. In an example, the selected logical channels may be selected in response to being mapped to the one or more transmission durations wherein the first logical channel is mapped. For example, in FIG. 17A, logical channels LC1, LC2, LC3 LC4 and LC5 are configured for a wireless device which are configured with priorities 5, 4, 3, 1, and 2 respectively. In an example, the higher a value of a configured priority is the lower the priority is. For example, LC4 which has a configured priority of 1 has the highest logical channel priority and LC1 which has a configured priority of 5 has the lowest logical channel priority in this example. In this example, data becomes available to LC3. LC3 is mapped to the one or more first transmission durations and the one or more second transmission durations and logical channels with uplink data ae LC1, LC3 and LC5. LC3 has higher logical channel priority among logical channels with uplink data that are mapped to the one or more first transmission durations. The wireless device triggers a buffer status report although LC3 does not have the highest priority among the logical channels with available data (e.g., LC3 has lower priority than LC2). On the other hand, if all logical channels are mapped to the same transmission duration (e.g., as shown in FIG. 17B), the wireless device does not trigger the buffer status report as LC3 does not have the highest priority among logical channels with uplink data that are mapped to the transmission duration.

In an example, base station may group a plurality of logical channels into one logical channel group. In an example configuration, the logical channel mapping to at least one TTI/transmission duration/numerology may be different for different logical channels within a logical channel group. BSR may not provide information on the resources required or buffered data mappable to different TTIs/numerologies.

The information about the buffer status of the logical channel group may not be provide adequate information for base station for providing a grant for an appropriate TTI/transmission duration/numerology for a wireless device. For the example 1 in FIG. 18, if logical channel 1 (LC1) and LC2 are in a logical channel group (LCG1), base station may not know if data reported by a BSR for the LCG1 is for the buffer(s) associated with LC1 or the buffer(s) associated with LC2. The BS may not transmit a grant for an appropriate TTI/transmission duration/numerology (e.g., first TTI(s)/transmission duration(s)/numerologie(s) or second TTI(s)/transmission duration(s)/numerologie(s)). For example, LC2 may have data in buffers associated with LC2 and LC1 may not have data in buffers associated with LC1. The base station may transmit a grant associated with second TTI(s)/transmission duration(s)/numerologie(s) but the grant may not be useful for transmission of data in LC2. Enhancements to logical channel grouping by a base station and/or wireless device behavior (e.g., in buffer status reporting) may be needed for efficient scheduling and/or improving the user performance. Example embodiments enhance base station logical channel grouping and/or wireless device behavior in buffer status reporting in response to the base station logical channel grouping.

In an example embodiment, a wireless device may receive one or more messages comprising one or more first fields indicating mapping between one or more logical channels and one or more TTIs/transmission durations/numerologies. In an example, the one or more messages may comprise one or more RRC messages. In an example, the one or more messages may comprise configuration parameters for the one or more logical channels. In an example, the one or more messages may comprise one or more second fields indicating one or more logical channel groups that the one or more logical channels belong to, wherein each logical channel group comprises one or more first logical channels and each of the one or more first logical channels are only mapped to one or more first TTIs/transmission durations/numerologies. The base station may map logical channels within a group to the same at least one TTI/transmission duration/numerology. In an example embodiment, the BS may not be configurable/capable to configure Example 1 in FIG. 18. The base station may be configurable/capable to configure Example 2 in FIG. 18.

In an example, a MAC entity may trigger a buffer status report (BSR) when one or more first conditions occur. In an example, the wireless device may receive a grant for transmission on a TTI/transmission duration/numerology. In an example, the wireless device may transmit the BSR on the TTI/transmission duration/numerology. In an example, the one or more first conditions may comprise data becoming available to a logical channel belonging to a logical channel group wherein one or more other logical channels belonging to the logical channel group have empty buffers. In an example, the one or more first conditions may comprise data becoming available to a logical channel with higher priority (e.g., in at least one TTI/transmission duration/numerology) than the priorities of other logical channels with available data. Other examples of the one or more first conditions may be provided.

In an example embodiment, a wireless device may receive one or more messages comprising one or more first fields indicating mapping between one or more logical channels and one or more TTIs/transmission durations/numerologies. In an example, the one or more messages may comprise one or more RRC messages. In an example, the one or more messages may comprise configuration parameters for the one or more logical channels. In an example, the one or more messages may comprise a logical channel identifier for each of the one or more logical channels. In an example, the one or more messages may comprise one or more second fields indicating one or more logical channel groups that the one or more logical channels belong to. In an example, the one or more messages may comprise a logical channel group identifier for one or more first logical channels of the one or more logical channels. In an example, a MAC entity may trigger a buffer status report (BSR) when one or more first conditions occur. In an example embodiment, logical channel configurations like the configuration in Example 1 of FIG. 18 may be allowed and/or implemented. In an example, at least two first logical channels with a same logical channel group identifier may be mapped to different at least one first TTI/transmission duration numerology. In an example, the wireless device may report buffer status of each of at least two first logical channels separately in the BSR. In an example, the wireless device may report buffer status of each logical channels in that group separately in the BSR. In an example, the wireless device may receive a grant for transmission on a TTI/transmission duration/numerology. In an example, the wireless device may transmit the BSR on the TTI/transmission duration/numerology. In an example, the one or more first conditions may comprise data becoming available to a logical channel belonging to a logical channel group wherein one or more other logical channels belonging to the logical channel group have empty buffers. In an example, the one or more first conditions may comprise data becoming available to a logical channel with higher priority (e.g., in at least one TTI/transmission duration/numerology) than the priorities of other logical channels with available data. Other examples of the one or more first conditions may be provided.

In an example, data for one or more logical channels may become available and a wireless device may keep receiving grants on TTIs/transmission durations/numerologies that the one or more logical channel may not be mapped to. The wireless device may not receive appropriate grant (e.g., grant that the one or more logical channels may be mapped to) leading to delay and inefficient operation for one or more applications. Enhancements to the triggering of BSR is needed to improve the performance of the wireless device. Example embodiments enhance the BSR triggering conditions in a wireless device.

In an example embodiment, a wireless device may receive one or more messages comprising one or more fields indicating mapping between one or more logical channels and one or more TTIs/transmission durations/numerologies. In an example, the wireless device may receive a grant for transmission on a TTI/transmission duration/numerology. The wireless device may trigger/transmit a BSR on the TTI/transmission duration/numerology employing the grant in response to no data in buffer(s) (e.g. buffer is empty, amount of data less than a value) associated with the logical channel(s) that are mapped to the TTI/transmission duration/numerology. At least one of the one or more logical channel may include data that is not mapped to the TTI/transmission duration/numerology.

In an example embodiment, a wireless device may receive one or more messages comprising one or more fields indicating mapping between one or more logical channels and one or more TTIs/transmission durations/numerologies. In an example, the wireless device may receive a grant for transmission on a TTI/transmission duration/numerology. In an example, if a wireless device has data on at least one logical channel that may not be mapped to the TTI/transmission duration/numerology, reception of the grant triggers the BSR.

In an example embodiment, a wireless device may receive one or more messages comprising one or more fields indicating mapping between one or more logical channels and one or more TTIs/transmission durations/numerologies. In an example, the one or more messages may comprise configuration parameters for a timer. In an example, the wireless device may start the timer in response to data becoming available for at least one of one or more first logical channels. The wireless device may stop the timer if a BSR was triggered while the timer was running. The wireless device may trigger a BSR when the timer expires. In an example, the one or more messages may comprise one or more configuration parameters for and/or indication of the one or more first logical channels. In an example, the one or more first logical channels may be associated with one or more delay-critical bearers (e.g., URLLC). The wireless device may receive a grant on a TTI/transmission duration/numerology. The wireless device may transmit the BSR on the TTI/transmission duration/numerology. In an example, the wireless device may stop the timer if the wireless device receives an uplink grant on a TTI/transmission duration/numerology that the one or more first logical channels are mapped to. In an example, the wireless device may stop the timer if the wireless device receives an uplink grant on a TTI/transmission duration/numerology that the one or more first logical channels is not mapped to and may trigger a BSR. In an example, the wireless device may stop the timer if the wireless device receives an uplink grant on a TTI/transmission duration/numerology that the one or more first logical channels is mapped to and may trigger a BSR. In an example, the wireless device may stop the timer if the wireless device receives an uplink grant on a TTI/transmission duration/numerology that the at least one of the one or more first logical channels is mapped to. In an example, the wireless device may stop the timer if the wireless device receives an uplink grant on a TTI/transmission duration/numerology that the at least one of the one or more first logical channels is not mapped to and may trigger a BSR. In an example, the wireless device may stop the timer if the wireless device receives an uplink grant on a TTI/transmission duration/numerology that the at least one of the one or more first logical channels is mapped to and may trigger a BSR. In an example, the wireless device may stop the timer if the wireless device receives an uplink grant on a TTI/transmission duration/numerology that the at least one of the one or more first logical channels and one or more second logical channels of the one or more first logical channels for which data became available while the timer was running is/are mapped to. In an example, the wireless device may stop the timer if the wireless device receives an uplink grant on a TTI/transmission duration/numerology that the at least one of the one or more first logical channels and one or more second logical channels of the one or more first logical channels for which data became available while the timer was running is/are not mapped to and may trigger a BSR. In an example, the wireless device may stop the timer if the wireless device receives an uplink grant on a TTI/transmission duration/numerology that the at least one of the one or more first logical channels and one or more second logical channels of the one or more first logical channels for which data became available while the timer was running is/are mapped to and may trigger a BSR. In an example, the wireless device may stop the timer if the wireless device receives an uplink grant. In an example, the wireless device may stop the timer if the wireless device receives an uplink grant and may trigger a BSR.

In an example embodiment, a wireless device may receive one or more messages comprising one or more fields indicating mapping between one or more logical channels and one or more TTIs/transmission durations/numerologies. In an example, the one or more messages may comprise configuration parameters for a counter. In an example, the wireless device may increment the counter if the wireless device has data available in at least one of the one or more first logical channels and the wireless device receives an uplink grant on a TTI/transmission duration/numerology wherein the one or more first logical channel is not mapped to the TTI/transmission duration/numerology. In an example, the wireless device may trigger a BSR when the counter reaches a first value and may reset the counter. In an example, the wireless device may reset the counter when a BSR is triggered. In an example, the one or more messages may comprise one or more configuration parameters for and/or indication of the one or more first logical channels. In an example, the one or more first logical channels may be associated with one or more delay-critical bearers (e.g., URLLC). The wireless device may receive a grant on a TTI/transmission duration/numerology. The wireless device may transmit the BSR on the TTI/transmission duration/numerology. In an example, the wireless device may reset the counter if the wireless device receives an uplink grant on a TTI/transmission duration/numerology that the one or more first logical channels are mapped to. In an example, the wireless device may reset the counter if the wireless device receives an uplink grant on a TTI/transmission duration/numerology that the one or more first logical channels is mapped to and may trigger a BSR. In an example, the wireless device may reset the counter if the wireless device receives an uplink grant on a TTI/transmission duration/numerology that the at least one of the one or more first logical channels is mapped to. In an example, the wireless device may reset the counter if the wireless device receives an uplink grant on a TTI/transmission duration/numerology that the at least one of the one or more first logical channels is mapped to and may trigger a BSR. In an example, the wireless device may reset the counter if the wireless device receives an uplink grant on a TTI/transmission duration/numerology that the at least one of the one or more first logical channels and one or more second logical channels of the one or more first logical channels for which data became available before the counter reaches the first value is/are mapped to. In an example, the wireless device may reset the counter if the wireless device receives an uplink grant on a TTI/transmission duration/numerology that the at least one of the one or more first logical channels and one or more second logical channels of the one or more first logical channels for which data became available before the counter reaches the first value is/are mapped to and may trigger a BSR.

In an example, a wireless device may trigger/transmit a first type BSR (e.g., padding/truncated BSR) if one or more criteria are met. In an example, the wireless device may transmit the first type BSR instead of transmitting padding if the one or more criteria are met. In an example, the wireless device may consider the priorities of logical channels/logical channel groups when transmitting the first type BSR. A logical channel may have one or more priorities on one or more TTIs/transmission durations/numerologies. Efficient transmission of BSR is needed to for base station scheduling and improving the performance of wireless device. Enhancements to the first type BSR format are needed to take into account the priority of a logical channel on a TTI/transmission duration/numerology. Example embodiments enhance the first type BSR format.

In an example embodiment, a wireless device may receive one or more messages comprising one or more fields indicating priorities of one or more logical channels on one or more transmission time intervals (TTIs)/transmission durations/numerologies. The wireless device may receive a grant for a first TTI/transmission duration/numerology. The wireless device may trigger a buffer status report (BSR) of a first type when one or more criteria is met. The wireless device may generate BSR and may transmit the BSR on the first TTI/transmission duration/numerology. In an example, the BSR may comprise a buffer status of a logical channel and/or logical channel group comprising a highest logical channel priority with data available for transmission on the first TTI/transmission duration/numerology.

In an example embodiment, a wireless device may receive one or more messages comprising one or more fields indicating priorities of one or more logical channels on one or more transmission time intervals (TTIs)/transmission durations/numerologies. The wireless device may receive a grant for a first TTI/transmission duration/numerology. The wireless device may trigger a buffer status report (BSR) of a first type when one or more criteria is met. The wireless device may generate BSR and may transmit the BSR on the first TTI/transmission duration/numerology. In an example, the BSR may comprise the buffer status of a logical channel and/or logical channel group comprising the highest logical channel priority with data available for transmission on a second TTI/transmission duration/numerology. In an example the second TTI/transmission/numerology may be a default/pre-configured TTI/transmission duration/numerology. In an example, the second TTI/transmission/numerology may be configured at the wireless device. In an example, the one or more messages may comprise one or more first fields indicating and/or comprising configuration parameters for the second TTI/transmission duration/numerology. In an example, the BSR may comprise a buffer status of a logical channel and/or logical channel group comprising a highest logical channel priority with data available for transmission on each of one or more third TTIs/transmission durations/numerologies. In an example, the third TTIs/transmission durations/numerologies may be pre-configured at the wireless device and/or indicated to the wireless device.

In an example, the one or more first criteria may comprise more than one logical channel and/or logical channel group having data available for transmission and number of padding bits being equal to or larger than size of short BSR MAC control element (MAC CE) plus a corresponding subheader and number of padding bits being smaller than size of a long BSR MAC CE plus a corresponding subheader. Other examples of one or more first criteria may be provided.

In an NR radio access network, a base station may configure a plurality of logical channels and/or logical channel groups for a wireless device. The wireless device may transmit BSR to report status of buffers associated with one or more logical channels and/or logical channel groups. The BSR format in LTE comprises short/truncated format and long format. The LTE short/truncated BSR format comprises buffers status of a single logical channel group. The LTE long BSR format comprises buffer status of all logical channel groups (4 logical channel groups in LTE). There is not enough flexibility in buffer status reporting of LTE. For example, BSR in LTE comprises one or four logical channel groups. In addition, for truncated BSR reporting, even if number of padding bits may be large enough to include buffer status of more than one logical channel group, the wireless device reports the buffer status of one logical channel group. In NR, number of logical channels and/or logical channel groups may increase and more flexibility in BSR reporting is needed to improve base station scheduling and wireless device performance. Example embodiments improve the BSR format for more flexible buffer status reporting by a wireless device.

In an example, the BSR may be one of a short format and a long format and/or other formats. In an example, the BSR may have a variable size. In an example, the size of BSR may depend on at least one of a first number of logical channels with available data. In an example, variable-size BSR format may comprise indication of logical channel(s) for which the buffer status is(are) included in the BSR. In an example, the indication may be one or more bitmaps. In an example, a value of one in the one or more bitmaps may indicate that a corresponding logical channel is included in the BSR. In an example, a value of zero in the one or more bitmaps may indicate that a corresponding logical channel is not included in the BSR. Example variable-size BSRs with bitmap indication are illustrated in the FIG. 19.

In an example, the BSR may be one of a short format and a long format and/or other formats. In an example, the BSR may have a variable size. In an example, the size of BSR may depend on a second number of logical channel groups with available data. In an example, variable-size BSR format may comprise indication of logical channel group(s) for which the buffer status is(are) included in the BSR. In an example, the indication may be one or more bitmaps. In an example, a value of one in the one or more bitmaps may indicate that a corresponding logical channel group is included in the BSR. In an example, a value of zero in the one or more bitmaps may indicate that a corresponding logical channel group is not included in the BSR. Example variable-size BSRs with bitmap indication are illustrated in the FIG. 19.

In an example, the variable-size BSR format may correspond to a MAC subheader without length field (e.g., fixed-size MAC subheader with no Length (L) field) and may comprise indication of BSR size (e.g., the one or more bitmap and/or other indication) in the BSR. In an example, the variable-size BSR format may correspond to a MAC subheader with length field (e.g., variable-size MAC subheader with Length (L) field). In an example, the L field may indicate the number of logical channels and/or logical channel groups for which buffer status is(are) included in the BSR. In an example, the L field may indicate the number of octets in the BSR. In an example, the BSR may comprise one or more logical channel identifiers and/or one or more logical channel group identifiers and buffer status corresponding to the one or more logical channels and/or the one or more logical channel groups. In an example embodiment, BSR length may be indicated in the BSR. In an example, a first field (e.g., at the beginning of BSR) may indicate the length of BSR. In an example, the length of BSR may be in terms of number of octets in the BSR. In an example, the length of BSR may be in terms of number of logical channel(s) and/or logical channel group(s) whose buffer status is(are) included in the BSR. Example variable-size BSR formats are shown in FIG. 20.

In an example embodiment, if a first type BSR (e.g., truncated BSR) is triggered, the UE may transmit a variable-size BSR. In an example, a wireless device may receive one or more messages comprising one or more fields indicating priorities of one or more logical channels on one or more transmission time intervals (TTIs)/transmission durations/ numerologies. The wireless device may receive a grant for a first TTI/transmission duration/numerology. The wireless device may trigger a buffer status report (BSR) of the first type when one or more criteria is met. The wireless device may generate variable-size BSR and may transmit the variable-size BSR on the first TTI/transmission duration/numerology. In an example, the variable-size BSR may comprise a buffer status of k logical channels and/or logical channel groups comprising k highest logical channel priority with data available for transmission on the first TTI/transmission duration/numerology wherein k may depend on the number of padding bits and/or leftover bits in the grant (e.g., k=1, 2, . . . ).

In an example embodiment, a wireless device may receive one or more messages comprising one or more fields indicating priorities of one or more logical channels on one or more transmission time intervals (TTIs)/transmission durations/numerologies. The wireless device may receive a grant for a first TTI/transmission duration/numerology. The wireless device may trigger a buffer status report (BSR) of a first type (e.g., truncated BSR) when one or more criteria is met. In an example, the one or more criteria may comprise more than one logical channel and/or logical channel group having data available for transmission and number of padding bits being equal to or larger than size of short BSR MAC control element (MAC CE) plus a corresponding subheader and number of padding bits being smaller than size of a long BSR MAC CE plus a corresponding subheader. The wireless device may generate variable-size BSR and may transmit the variable-size BSR on the first TTI/transmission duration/numerology. In an example, the BSR may comprise the buffer status of k logical channels and/or logical channel groups comprising the k highest logical channel priority with data available for transmission on a second TTI/transmission duration/numerology wherein k may depend on the number of padding bits and/or leftover bits in the grant (e.g., k=1, 2, . . . ). In an example the second TTI/transmission duration/numerology may be a default/pre-configured TTI/transmission duration/numerology. In an example, the second TTI/transmission duration/numerology may be configured at the wireless device. In an example, the one or more messages may comprise one or more first fields indicating and/or comprising configuration parameters for the second TTI/transmission duration/numerology. In an example, the variable-size BSR may comprise a buffer status of k logical channels and/or logical channel groups comprising k highest logical channel priority with data available for transmission on each of one or more third TTIs/transmission durations/numerologies wherein k may depend on the number of padding bits and/or leftover in the grant (e.g., k=1, 2, . . . ). In an example, the third TTIs/transmission durations/numerologies may be pre-configured at the wireless device and/or indicated to the wireless device.

Figure 21:
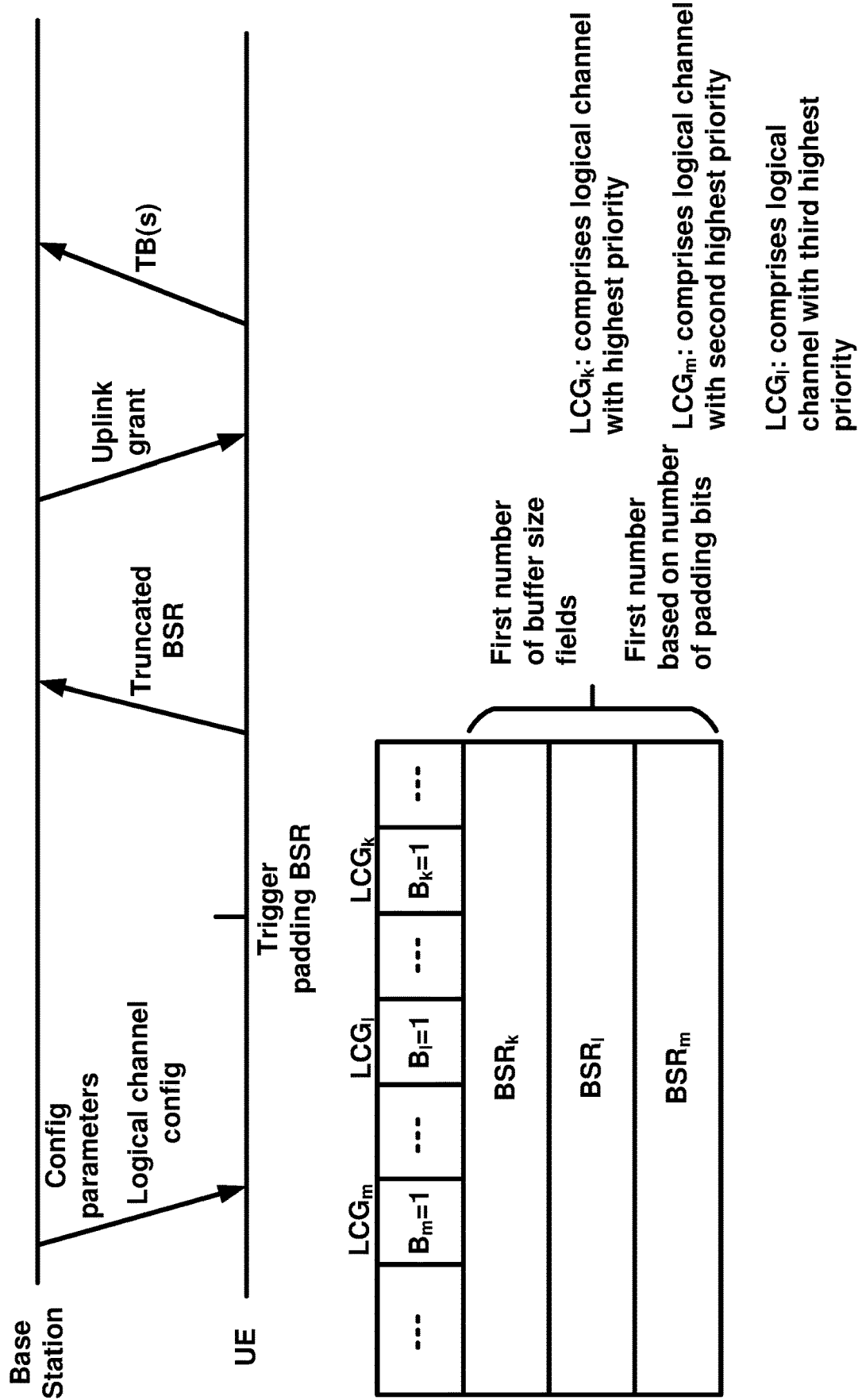
FIG. 21 is a diagram of example buffer status report format and process as per an aspect of an embodiment of the present disclosure.

In an example embodiment, as shown in FIG. 21, the wireless device may receive configuration parameters for a plurality of logical channels. The plurality of logical channels may be grouped into a plurality of logical channel groups. In an example, the configuration parameters may indicate a logical channel in the plurality of logical channels belongs to a logical channel group in the plurality of logical channel groups. In an example, the wireless device may trigger a padding BSR. In an example, the wireless device may trigger a padding BSR when the wireless device allocates resources of an uplink grant and the number of padding bits is larger than size of a buffer status report MAC CE (e.g., short BSR) plus its subheader. In an example, the wireless device may transmit a truncated BSR in response to the triggering the padding BSR and the number of the padding bits being larger than a size of a short BSR plus its subheader but smaller than a size of long BSR plus its subheader.

In an example, the truncated BSR comprises a first field comprising a plurality of presence bits. The first bit may comprise one octet (e.g., eight presence bits). In an example, a presence bit in the plurality of presence bits may correspond to a logical channel group. In an example, a position of the presence bit in the plurality of presence bits may indicate an index of the corresponding logical channel group. In an example, the presence bit indicates whether the truncated BSR comprises a buffer size for the logical channel group corresponding to the presence bit. In an example, the presence bit indicates whether a buffer size field for the logical channel group corresponding to the presence bit is present at the truncated BSR or not. The buffer size field may indicate an amount of data available across logical channels of the logical channel group corresponding to a presence bit.

In an example, there may be a first number of buffer size fields in the truncated BSR. In an example, the first number of buffer size fields may be for logical channel groups of the plurality of logical channel groups with logical channels having available data for transmission following a decreasing order of priority. In an example, the first number may be based on the number of padding bits.

For the example in FIG. 21, the number of padding bits may allow transmission of three buffer size fields corresponding to three logical channel groups. In this example, logical channel group $LCG_k$, logical channel group $LCG_m$ and logical channel group $LCG_l$ comprise respectively, logical channel with highest, logical channel with second highest and logical channel with third highest priority. The truncated BSR may comprise buffer size fields for $LCG_k$, $LCG_m$ and $LCG_l$ and the corresponding presence bits in the first field may indicate a value of one. The wireless device may transmit the truncated BSR and may receive an uplink grant in response to transmitting the buffer status report. The uplink grant may be received via downlink control information and may comprise transmission parameters for transmission of one or more transport blocks. The transmission parameters may comprise resource allocation parameters, HARQ related parameters, power control parameters, etc. The wireless device may transmit the one or more transport blocks based on the uplink grant.

Figure 22:
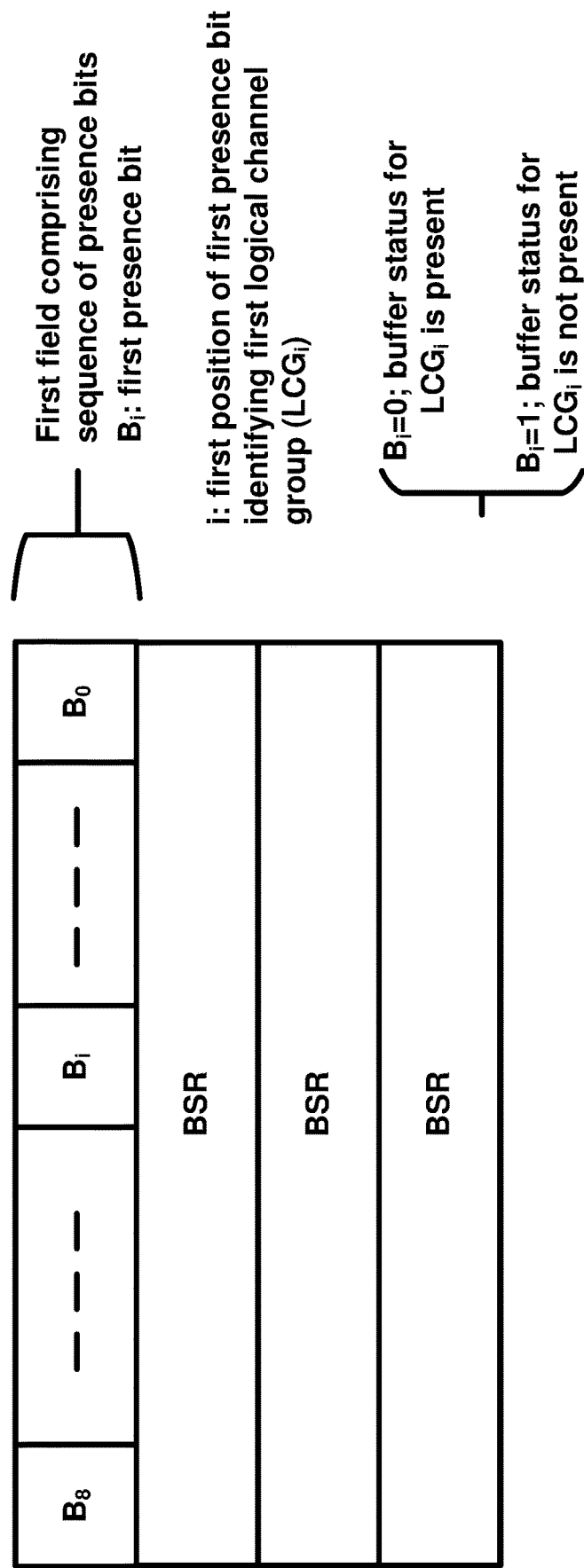
FIG. 22 is a diagram of example buffer status report format and process as per an aspect of an embodiment of the present disclosure.

In an example embodiment, as shown in FIG. 22, a first presence bit (e.g., Bi) of a first field comprising a sequence of presence bits may indicate a first position (e.g., position i). The first position (position i) may identify a first logical channel group in the plurality of logical channel groups (e.g., LCGi). In an example, the value of Bi may indicate whether a corresponding buffer size field for LCGi is present in the truncated BSR or not. In an example, a value of one for Bi may indicate that a corresponding buffer size field is present for LCGi. In an example, a value of zero for Bi may indicate that a corresponding buffer size field is not present for LCGi.

To improve robustness of buffer status reporting procedure, a wireless device may be configured with a timer that starts in response to one or more conditions. The one or more conditions may comprise transmitting a BSR or receiving an uplink grant for transmission of new data. The wireless device may trigger a buffer status report in response to the timer expiring. This process ensures that BSR is transmitted frequently enough so that the base station has enough information regarding available data of the wireless device and can efficiently schedule the wireless device. The legacy timer management procedures comprise restarting the timer in response to receiving of an uplink grant for transmission of new data. However, unlike the legacy LTE radio access network, an uplink grant in NR radio access network, may not be useful for transmission of any data. An uplink grant in NR may be useful for transmission of a subset of data/logical channels of the wireless device. The legacy procedure may lead to frequently restarting the timer and transmitting the BSR less frequently. The legacy procedures lead to reduced frequency of BSR transmission and hence the base station may lack enough information of efficient scheduling of the wireless device. Legacy timer management procedure leads to degraded wireless device and network performance in terms of throughput, delay and other performance metrics. Example, embodiments enhance the legacy buffer status reporting procedure by enhancing the processes for managing the timer.

In an example embodiment, a base station may configure (e.g., using semi-static/RRC configuration and/or dynamic signalling) a wireless device with a first timer (e.g., retxBSR-timer). In an example, the wireless device may start or restart the first timer if/when the MAC entity instructs generation of a buffer status report (e.g., BSR MAC CE). In an example, the wireless device may start or restart the first timer if/when the MAC entity instructs generation of a buffer status report (e.g., BSR MAC CE) except a padding BSR. In an example, the wireless device may start or restart the first timer if/when the MAC entity instructs generation of a buffer status report (e.g., BSR MAC CE) except a padding BSR or a truncated BSR. In an example, the wireless device may start or restart the first timer upon indication of one or more grants wherein the one or more grants provide resources for transmission of new data (e.g., on any UL-SCH) and logical channels with available data may be mapped to the TTI/transmission duration/numerology/cell indicated in the one or more grants. In an example, the one or more grants may be received during a time window. In an example, the time window may be configurable (e.g., using RRC configuration). In an example, the one or more grants may be received during n subframes (e.g., n=1, 2, . . . ). In an example, the value of n may be indicated to the wireless device (e.g., with RRC and/or dynamic signaling). In an example, a MAC entity may trigger BSR when the first timer expires.

In an example embodiment, a base station may configure (e.g., using semi-static/RRC configuration and/or dynamic signalling) a wireless device with one or more first timers. In an example, the base station may configure one or more first timers for the plurality of logical channels and/or logical channel groups. In an example, the base station may configure a timer per logical channel and/or logical channel group. In an example, the base station may configure one or more first timers for one or more first logical channel and one or more second logical channel groups. The wireless device may start or restart the one or more first timers if/when the MAC entity instructs generation of a buffer status report (e.g., BSR MAC CE). In an example, the wireless device may start or restart the one or more timers of the one or more first timers if/when the MAC entity instructs generation of a buffer status report (e.g., BSR MAC CE) comprising one or more logical channels and/or logical channel groups corresponding to the one or more timers. In an example, the wireless device may start or restart the one or more first timers if/when the MAC entity instructs generation of a buffer status report (e.g., BSR MAC CE) except a padding BSR or a truncated BSR. In an example, the wireless device may start or restart the one or more timers of the one or more first timers if/when the MAC entity instructs generation of a buffer status report (e.g., BSR MAC CE) comprising one or more logical channels and/or logical channel groups corresponding to the one or more timers except a padding BSR or a truncated BSR. In an example when the wireless device receives a grant associated with a logical channel and/or logical channel group, a timer associated with the logical channel and/or logical channel group may be started/restarted. In an example, when a timer associated with at least one logical channel and/or logical channel group expires, a BSR for the at least one logical channel and/or logical channel group may be triggered. In an example, when a timer associated with at least one logical channel and/or logical channel group expires, a BSR for all logical channels and/or logical channel groups may be triggered.

Figure 23:
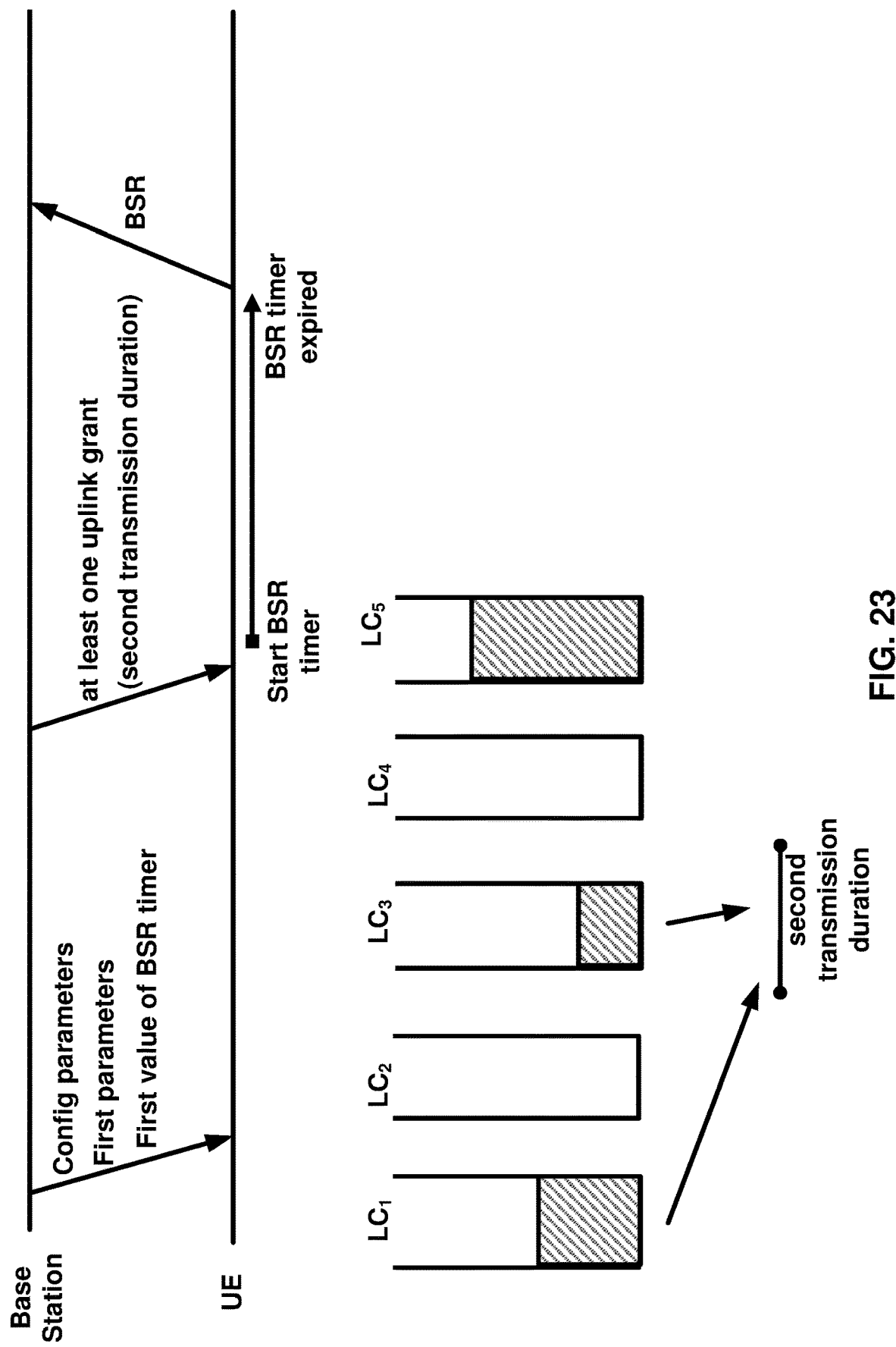
FIG. 23 is a diagram of example buffer status report triggering as per an aspect of an embodiment of the present disclosure.

In an example embodiment, as shown in FIG. 23, a wireless device may receive one or more messages comprising configuration parameters. In an example, the configuration parameters may comprise logical channel configuration parameters for a plurality of logical channels. In an example, the configuration parameters may comprise first parameters of one or more logical channels indicating that a logical channel of the one or more logical channels is mapped to at least one first transmission duration. In an example, the configuration parameters may comprise a second parameter indicating a first value of a buffer status report timer. In an example, the buffer status report timer may be a retxBSR-Timer.

In an example, the wireless device may start the buffer status report timer with the first value in response to receiving at least one uplink grant associated with a second transmission duration and at least one logical channel with data of the one or more logical channels being mapped to the second transmission duration that the at least one uplink gran is associated with. In an example, the wireless device may start the buffer status report timer with the first value in response to receiving at least one uplink grant associated with a second transmission duration and logical channel with data of the one or more logical channels being mapped to the second transmission duration that the at least one uplink gran is associated with.

The wireless device may transmit the buffer status report in response to the buffer status report timer expiring. In an example, the wireless device may continue running the buffer status report timer (e.g., not start the buffer status report timer) in response to the receiving the at least one uplink grant associated with a second transmission duration and none of logical channel with data of the one or more logical channels being mapped to the second transmission duration that the at least one uplink gran is associated with.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 24:
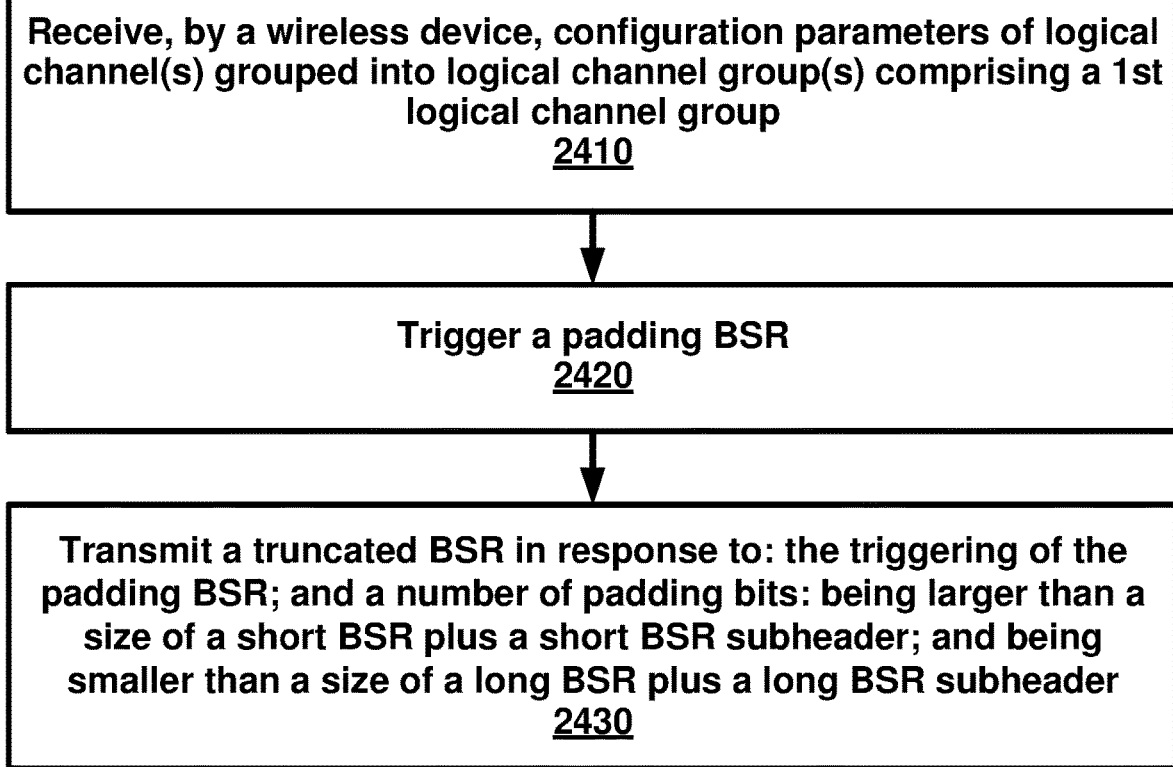
FIG. 24 is an example flow diagram as per an aspect of an embodiment of the present disclosure.

FIG. 24 is an example flow diagram as per an aspect of an embodiment of the present disclosure. At 2410, a wireless device may receive configuration parameters of a plurality of logical channels. The plurality of logical channels may be grouped into a plurality of logical channel groups. The plurality of logical channel groups may comprise a first logical channel group. At 2420, a padding buffer status report (BSR) may be triggered. At 2430, a truncated BSR may be transmitted in response to: the triggering the padding BSR; and a number of padding bits meeting one or more criteria. The one or more criteria may comprise, for example, the number of padding bits being: larger than a size of a short BSR plus a short BSR subheader; smaller than a size of a long BSR plus a long BSR subheader; a combination thereof, and/or the like. The truncated BSR may comprise: a first field comprising a plurality of presence bits. A presence bit in the plurality of presence bits may indicate a presence of a buffer size field for the first logical channel group corresponding to the presence bit. The buffer size field may indicate an amount of data available across logical channels of the first logical channel group. The truncated BSR may comprise: a first number of buffer size fields for logical channel groups of the plurality of logical channel groups with logical channels having available data for transmission following a decreasing order of priority. The first number may be determined based on the number of padding bits.

According to an embodiment, the configuration parameters may indicate a priority for a logical channel in the plurality of logical channels. According to an embodiment, a downlink control information comprising an uplink grant indicating an uplink resource assignment may be received. According to an embodiment, the number of padding bits may be at least based on a size of the uplink grant. According to an embodiment, the truncated BSR may be associated with a medium access control subheader comprising a logical channel identifier and a length field. The length field may indicate a length of the truncated BSR. According to an embodiment, the first number of buffer size fields may be determined based on a size of the truncated BSR that fit in the padding bits. According to an embodiment, a size of the truncated BSR may depend on the first number of buffer size fields. According to an embodiment, a first position of the first presence bit in the first field may identify a logical channel identifier. According to an embodiment, a first value of one for the first presence bit may indicate that the buffer size field for the first logical channel group corresponding to the first presence bit is present; and a second value of zero for the first presence bit may indicate that the buffer size field for the first logical channel group corresponding to the first presence bit is not present. According to an embodiment, the transmitting the truncated BSR may be further in response to: the triggering the padding BSR; and the number of padding bits being equal to the size of the short BSR plus the short BSR subheader.

Figure 25:
FIG. 25 is an example flow diagram as per an aspect of an embodiment of the present disclosure.

FIG. 25 is an example flow diagram as per an aspect of an embodiment of the present disclosure. At 2510, a wireless device may receive configuration parameters of a plurality of logical channels plurality of logical channels may be grouped into a plurality of logical channel groups. The plurality of logical channel groups may comprise a first logical channel group. At 2520, a truncated buffer status report (BSR) may be transmitted in response to a number of padding bits being: larger than a size of a short BSR plus a short BSR subheader; and smaller than a size of a long BSR plus a long BSR subheader. The truncated BSR may comprise: a first field comprising a plurality of presence bits. A presence bit in the plurality of presence bits may indicate a presence of a buffer size field for the first logical channel group corresponding to the presence bit. The buffer size field may indicate an amount of data available across logical channels of the first logical channel group. A first number of buffer size fields for logical channel groups of the plurality of logical channel groups with logical channels having available data for transmission may follow a decreasing order of priority. The first number may be determined based on the number of padding bits.

According to an embodiment, the configuration parameters may indicate a priority for a logical channel in the plurality of logical channels. According to an embodiment, the wireless device may further receive a downlink control information comprising an uplink grant indicating an uplink resource assignment. According to an embodiment, the number of padding bits may be at least based on a size of the uplink grant. According to an embodiment, the truncated BSR may be associated with a medium access control subheader comprising a logical channel identifier and a length field. The length field may indicate a length of the truncated BSR. According to an embodiment, the first number of buffer size fields may be determined based on a size of the truncated BSR that fit in the padding bits. According to an embodiment, a size of the truncated BSR may depend on the first number of buffer size fields. According to an embodiment, a first position of the first presence bit in the first field may identify a logical channel identifier. According to an embodiment, a first value of one for the first presence bit may indicate that the buffer size field for the first logical channel group corresponding to the first presence bit is present; and a second value of zero for the first presence bit may indicate that the buffer size field for the logical channel group corresponding to the first presence bit is not present. According to an embodiment, the wireless device may further receive an uplink grant in response to transmitting the truncated BSR. According to an embodiment, the wireless device may transmit the truncated BSR further in response to: the triggering the padding BSR; and the number of padding bits being equal to the size of the short BSR plus the short BSR subheader.

Figure 26:
FIG. 26 is an example flow diagram as per an aspect of an embodiment of the present disclosure.

FIG. 26 is an example flow diagram as per an aspect of an embodiment of the present disclosure. At 2610, a wireless device may receive configuration parameters of a plurality of logical channels grouped into a plurality of logical channel groups. At 2620, a truncated buffer status report (BSR) may be transmitted in response to a number of padding bits: being larger than a size of a short BSR plus a short BSR subheader; and being smaller than a size of a long BSR plus a long BSR subheader. The truncated BSR may comprise: a first field comprising a sequence of presence bits comprising a first presence bit for a first logical channel group in the plurality of logical channel groups. A first position of the first presence bit in the first field may identify an identifier of the first logical channel group. A value of the first presence bit may indicate a presence of a buffer size field for the first logical channel group. A first number of buffer size fields for the first number of logical channel groups with logical channels may have available data for transmission following a decreasing order of priority The first number may be determined based on the number of padding bits.

Figure 27:
FIG. 27 is an example flow diagram as per an aspect of an embodiment of the present disclosure.

FIG. 27 is an example flow diagram as per an aspect of an embodiment of the present disclosure. At 2710, a base station may transmit configuration parameters of a plurality of logical channels grouped into a plurality of logical channel groups comprising a first logical channel group. At 2720, a truncated BSR may be received in response to a number of padding bits: being larger than a size of a short BSR plus a short BSR subheader; and being smaller than a size of a long BSR plus a long BSR subheader. The truncated BSR may comprise a first field comprising a plurality of presence bits. A presence bit in the plurality of presence bits may indicate a presence of a buffer size field for the first logical channel group corresponding to the presence bit. The buffer size field may indicate an amount of data available across logical channels of the first logical channel group. A first number of buffer size fields for the first number of logical channel groups of the plurality of logical channel groups with logical channels may have available data for transmission following a decreasing order of priority. The first number may be determined based on the number of padding bits.

According to an embodiment, a wireless device may receive configuration parameters of a plurality of logical channels plurality of logical channels may be grouped into a plurality of logical channel groups. The plurality of logical channel groups may comprise a first logical channel group. The wireless device may transmit a truncated buffer status report (BSR) in response to a number of padding bits being: larger than a size of a short BSR plus a short BSR subheader; and smaller than a size of a long BSR plus a long BSR subheader. The truncated BSR may comprise: a first field comprising a plurality of presence bits. A presence bit in the plurality of presence bits may indicate a presence of a buffer size field for the first logical channel group corresponding to the presence bit. The truncated BSR may comprise: a first number of buffer size fields for logical channel groups of the plurality of logical channel groups with logical channels having available data for transmission may follow a decreasing order of priority. The first number may be determined based on the number of padding bits.

FIG. 28 is an example flow diagram as per an aspect of an embodiment of the present disclosure. At 2810, a wireless device may receive, from a base station, configuration parameters of a plurality of logical channels. The plurality of logical channels may comprise a first logical channel having a first logical channel priority. The first logical channel may be mapped to one or more transmission durations. At 2820, a buffer status report may be triggered in response to: uplink data becoming available for the first logical channel in a first plurality of logical channels with uplink data; and the first logical channel priority being higher than one or more priorities of one or more selected logical channels in the first plurality of logical channels. The one or more selected logical channels may be selected in response to being mapped to the one or more transmission durations. At 2830, the buffer status report may be transmitted to the base station.

According to an embodiment, the one or more selected logical channels may be fewer than the first plurality of logical channels. According to an embodiment, the uplink data may become available for the first logical channel in response to the uplink data becoming available in an uplink buffer of the first logical channel. The uplink buffer may be a radio link control buffer or a packet data convergence protocol buffer. According to an embodiment, the plurality of logical channels may be grouped into a first plurality of logical channel groups; and the buffer status report may indicate a buffer status of one or more logical channel groups in the first plurality of logical channel groups. According to an embodiment, the buffer status report may be one of a short format, a long format or a truncated format. According to an embodiment, the configuration parameters may indicate whether a second logical channel in the one or more selected logical channels is mapped to the one or more transmission durations. According to an embodiment, the first logical channel may have one logical channel priority for the one or more transmission durations. According to an embodiment, the plurality of logical channels may be grouped based on a logical channel mapping to transmission durations. According to an embodiment, the configuration parameters may comprise a first logical channel identifier for the first logical channel. According to an embodiment, the wireless device may further receive an uplink grant in response to transmitting the buffer status report.

Figure 29:
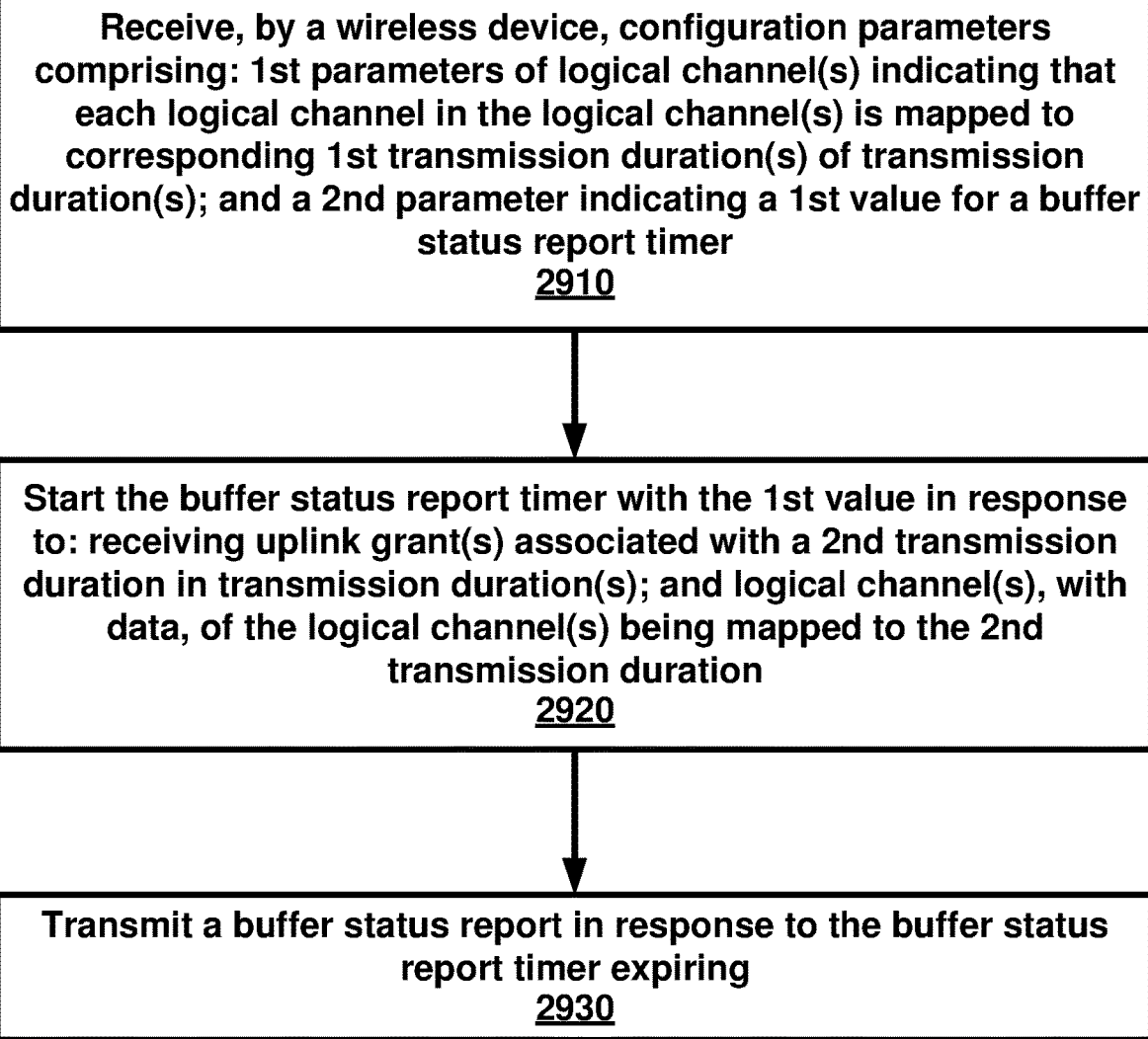
FIG. 29 is an example flow diagram as per an aspect of an embodiment of the present disclosure.

FIG. 29 is an example flow diagram as per an aspect of an embodiment of the present disclosure. At 2910, a wireless device may receive configuration parameters comprising: first parameters of one or more logical channels indicating that each logical channel of the one or more logical channels is mapped to corresponding one or more first transmissions durations of a plurality of transmission durations; and a second parameter indicating a first value for a buffer status report timer. At 2920, the buffer status report timer may be started with the first value in response to: receiving at least one uplink grant associated with a second transmission duration; and at least one logical channel, with data, of the one or more logical channels being mapped to the second transmission duration. At 2930, a buffer status report may be transmitted in response to the buffer status report timer expiring.

According to an embodiment, the wireless device may continue running the buffer status report timer in response to: receiving at least one uplink grant associated with the second transmission duration; and none of the at least one logical channel, with data, in the one or more logical channels being mapped to the second transmission duration. According to an embodiment, the configuration parameters may indicate a time window, and the at least one uplink grant is received within the time window. According to an embodiment, the buffer status report may indicate at least a buffer status of the one or more logical channels. According to an embodiment, the wireless device may transmit the buffer status report based on at least one of the at least one uplink grant. According to an embodiment, the wireless device may start the first buffer status report timer with the first value in response to instructing a multiplexing and assembly procedure to generate a buffer status report medium access control (MAC) control element. According to an embodiment, the buffer status report may have one of a short format, a truncated format or a long format. According to an embodiment, the buffer status report may indicate a buffer status of one or more second logical channels of the one or more logical channels. According to an embodiment, the first parameters may comprise a corresponding logical channel identifier for each of the one or more logical channels. According to an embodiment, the wireless device may receive an uplink grant in response to transmitting the buffer status report.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
    receiving by a wireless device and from a base station, one or more parameters comprising:
        a first parameter indicating a first priority of a first logical channel and that the first logical channel is mapped to a first transmission duration value; and
        a second parameter indicating a second priority, higher than the first priority, of a second logical channel and that the second logical channel is not mapped to the first transmission duration value;
    at a time where uplink data is available for the second logical channel, triggering a buffer status report in response to:
        uplink data becoming available for the first logical channel; and
        the first priority of the first logical channel being highest of priority among logical channels that have uplink data available and are mapped to the first transmission duration value; and
    transmitting the buffer status report.

2. The method of claim 1, wherein the first logical channel being mapped to the first transmission duration value causes transmission of uplink data of the first logical channel to be restricted to transmission durations having a length that is less than or equal to the first transmission duration value.

3. The method of claim 1, wherein the uplink data becoming available for the first logical channel is in response to the uplink data becoming available in an uplink buffer of the first logical channel, wherein the uplink buffer is a radio link control buffer or a packet data convergence protocol buffer.

4. The method of claim 1, wherein the buffer status report indicates a buffer status of the first logical channel and one or more other logical channels.

5. The method of claim 1, wherein the buffer status report is one of a short format, a long format, or a truncated format.

6. The method of claim 1, further comprising receiving a third parameter indicating that a third logical channel is mapped to the first transmission duration value.

7. The method of claim 6, wherein the third logical channel has a third priority lower than the first priority.

8. The method of claim 6, wherein the first logical channel and the third logical channel are grouped based on a logical channel mapping to transmission durations.

9. The method of claim 1, further comprising receiving a first logical channel identifier for the first logical channel.

10. The method of claim 1, further comprising receiving an uplink grant in response to transmitting the buffer status report.

11. A wireless device comprising:
    one or more processors; and
    memory storing instructions that, when executed by the one or more processors, cause the wireless device to:
        receive, from a base station, one or more parameters comprising:
            a first parameter indicating a first priority of a first logical channel and that the first logical channel is mapped to a first transmission duration value; and
            a second parameter indicating a second priority, higher than the first priority, of a second logical channel and that the second logical channel is mapped to a transmission duration value different from the first transmission duration value;
        at a time where uplink data is available for the second logical channel, trigger a buffer status report in response to:
            uplink data becoming available for the first logical channel; and
            the first priority of the first logical channel being highest of priority among logical channels that have uplink data available and are mapped to the first transmission duration value; and
        transmit the buffer status report.

12. The wireless device of claim 11, wherein the first logical channel being mapped to the first transmission duration value causes transmission of uplink data of the first logical channel to be restricted to transmission durations having a length that is less than or equal to the first transmission duration value.

13. The wireless device of claim 11, wherein the uplink data becoming available for the first logical channel is in response to the uplink data becoming available in an uplink buffer of the first logical channel, wherein the uplink buffer is a radio link control buffer or a packet data convergence protocol buffer.

14. The wireless device of claim 11, wherein the buffer status report indicates a buffer status of the first logical channel and one or more other logical channels.

15. The wireless device of claim 11, wherein the buffer status report is one of a short format, a long format or a truncated format.

16. The wireless device of claim 11, wherein the instructions, when executed by the one or more processors, further cause the wireless device to receive a third parameter indicating that a third logical channel is mapped to the first transmission duration value.

17. The wireless device of claim 16, wherein the third logical channel has a third priority lower than the first priority.

18. The wireless device of claim 16, wherein the first logical channel and the third logical channel are grouped based on a logical channel mapping to transmission durations.

19. The wireless device of claim 11, wherein the instructions, when executed by the one or more processors, further cause the wireless device to receive a first logical channel identifier for the first logical channel.

20. The wireless device of claim 11, wherein the instructions, when executed by the one or more processors, further cause the wireless device to receive an uplink grant in response to transmitting the buffer status report.

\* \* \* \* \*